US011167626B2

(12) United States Patent
Royer et al.

(10) Patent No.: US 11,167,626 B2
(45) Date of Patent: *Nov. 9, 2021

(54) TARPAULIN RETRACTION AND EXTENSION DEVICE

(71) Applicant: FABRICATION ELCARGO INC., Saint-Hyacinthe (CA)

(72) Inventors: Real Royer, Saint-Hyacinthe (CA); Keven Boutin, Drummondville (CA)

(73) Assignee: FABRICATION ELCARGO INC., Saint-Hyacinthe (CA)

(*) Notice: Subject to any disclaimer, the term of this patent is extended or adjusted under 35 U.S.C. 154(b) by 75 days.

This patent is subject to a terminal disclaimer.

(21) Appl. No.: 16/864,352

(22) Filed: May 1, 2020

(65) Prior Publication Data
US 2020/0298689 A1    Sep. 24, 2020

Related U.S. Application Data

(63) Continuation of application No. 15/909,627, filed on Mar. 1, 2018, now Pat. No. 10,675,957.

(51) Int. Cl.
| | | |
|---|---|---|
| *B60J 7/08* | (2006.01) | |
| *B60P 7/04* | (2006.01) | |
| *B60J 11/02* | (2006.01) | |
| *E05F 15/608* | (2015.01) | |
| *E05F 11/34* | (2006.01) | |
| *B65D 88/12* | (2006.01) | |

(52) U.S. Cl.
CPC ............... *B60J 7/085* (2013.01); *B60J 11/02* (2013.01); *B60P 7/04* (2013.01); *B65D 88/125* (2013.01); *E05F 11/34* (2013.01); *E05F 15/608* (2015.01)

(58) Field of Classification Search
CPC .. B60P 7/04; B60J 11/02; B60J 11/025; B60J 7/141; B60J 7/085; B60J 7/102; B60J 7/068; E04H 15/34; E04H 15/64; E05F 15/608; E05F 11/34; B65D 88/125
USPC ................... 296/98, 100.11, 100.12, 100.14
See application file for complete search history.

(56) References Cited

U.S. PATENT DOCUMENTS

| | | | |
|---|---|---|---|
| 473,292 | A | 4/1892 | Campbell et al. |
| 1,318,820 | A | 10/1919 | Watkins |
| 1,784,248 | A | 12/1930 | Nolen et al. |
| 1,786,048 | A | 12/1930 | Williams |
| 2,562,300 | A | 7/1951 | Dingman |
| 2,976,082 | A | 3/1961 | Dahlman |
| 2,997,967 | A | 8/1961 | Malapert |
| 3,366,414 | A | 1/1968 | Gile et al. |

(Continued)

FOREIGN PATENT DOCUMENTS

CA    1212974    10/1986

OTHER PUBLICATIONS

European Search report for European patent application 19159728.5, corresponding to the present patent application, dated Jul. 25, 2019.

*Primary Examiner* — Gregory A Blankenship

(57) ABSTRACT

A device for covering at least part of a container using a tarpaulin. The device includes a rod to deploy the tarpaulin across the container and an actuator. An arm extends between the actuator and the rod to allow the actuator to rotate the rod, the arm having an arm first end coupled to the rod and an opposed arm second end. The rod is coupled to the container so that the rod second end is movable relative to the container.

21 Claims, 11 Drawing Sheets

(56) References Cited

U.S. PATENT DOCUMENTS

| | | | |
|---|---|---|---|
| 3,384,413 A | 5/1968 | Sargent | |
| 3,423,126 A | 1/1969 | Galvin et al. | |
| 3,768,540 A | 10/1973 | Mc Swain | |
| 3,785,694 A | 1/1974 | Sargent | |
| 3,819,082 A | 6/1974 | Rosenvold | |
| 3,829,154 A | 8/1974 | Becknell | |
| 3,889,321 A | 6/1975 | Moser | |
| 4,027,360 A | 6/1977 | Moser | |
| 4,212,492 A | 7/1980 | Johnsen | |
| 4,225,175 A | 9/1980 | Fredin | |
| 4,234,224 A | 11/1980 | Rosenvold | |
| 4,279,064 A | 7/1981 | Simme | |
| 4,302,043 A | 11/1981 | Dimmer et al. | |
| 4,369,009 A | 1/1983 | Fulford | |
| 4,380,350 A | 4/1983 | Block | |
| RE31,746 E | 11/1984 | Dimmer et al. | |
| 4,484,732 A | 11/1984 | Gould | |
| 4,484,777 A | 11/1984 | Michel | |
| 4,505,512 A | 3/1985 | Schmeichel et al. | |
| 4,518,193 A | 5/1985 | Heider et al. | |
| 4,529,098 A | 7/1985 | Heider et al. | |
| 4,657,062 A | 4/1987 | Tuerk | |
| 4,659,134 A | 4/1987 | Johnson | |
| 4,673,208 A | 6/1987 | Tsukamoto | |
| 4,691,957 A | 9/1987 | Ellingson | |
| 4,700,985 A | 10/1987 | Whitehead | |
| 4,834,445 A * | 5/1989 | Odegaard | B60J 7/085 160/245 |
| 4,858,984 A | 8/1989 | Weaver | |
| 4,909,563 A | 3/1990 | Walker | |
| 4,915,439 A | 4/1990 | Cramaro | |
| 4,987,942 A | 1/1991 | Eriksson | |
| 4,991,901 A | 2/1991 | Meekhof, Sr. et al. | |
| 5,002,328 A * | 3/1991 | Michel | B60J 7/085 296/98 |
| 5,026,109 A | 6/1991 | Merlot, Jr. | |
| 5,050,923 A | 9/1991 | Petelka | |
| 5,086,908 A | 2/1992 | Gladish et al. | |
| 5,174,625 A | 12/1992 | Gothier et al. | |
| 5,179,991 A | 1/1993 | Haddad, Jr. | |
| 5,180,203 A | 1/1993 | Goudy | |
| 5,186,231 A | 2/1993 | Lewis | |
| 5,211,440 A | 5/1993 | Cramaro | |
| 5,240,303 A | 8/1993 | Hageman | |
| 5,253,914 A | 10/1993 | Biancale | |
| 5,328,228 A | 7/1994 | Klassen | |
| 5,429,403 A | 7/1995 | Brasher | |
| 5,466,030 A | 11/1995 | Harris et al. | |
| 5,540,475 A | 7/1996 | Kersting et al. | |
| 5,542,734 A | 8/1996 | Burchett et al. | |
| 5,549,347 A | 8/1996 | Anderson | |
| 5,658,037 A | 8/1997 | Evans et al. | |
| 5,690,377 A | 11/1997 | Denyer | |
| 5,692,793 A | 12/1997 | Wilson | |
| 5,697,663 A | 12/1997 | Chenowth | |
| 5,713,712 A | 2/1998 | McIntyre | |
| 5,762,002 A | 6/1998 | Dahlin et al. | |
| 5,765,901 A * | 6/1998 | Wilkens | B60J 7/085 296/100.16 |
| 5,794,528 A | 8/1998 | Gronig et al. | |
| 5,823,067 A | 10/1998 | Clarys et al. | |
| 5,911,467 A | 6/1999 | Evans et al. | |
| 5,924,758 A * | 7/1999 | Dimmer | B60J 7/085 296/98 |
| 5,938,270 A | 8/1999 | Swanson et al. | |
| 5,984,379 A | 11/1999 | Michel et al. | |
| 6,007,138 A | 12/1999 | Cramaro | |
| 6,135,534 A | 10/2000 | Schmeichel | |
| 6,142,553 A | 11/2000 | Bodecker | |
| 6,142,554 A | 11/2000 | Carroll et al. | |
| 6,152,516 A | 11/2000 | Williams | |
| 6,193,299 B1 | 2/2001 | Than | |
| 6,199,935 B1 * | 3/2001 | Waltz | B60J 7/085 296/100.14 |
| 6,206,449 B1 * | 3/2001 | Searfoss | B60J 7/085 296/100.14 |
| 6,234,562 B1 | 5/2001 | Henning | |
| 6,318,790 B1 | 11/2001 | Henning | |
| 6,322,041 B1 | 11/2001 | Schmeichel | |
| 6,361,100 B1 | 3/2002 | Koester | |
| 6,435,595 B1 | 8/2002 | Chenowth | |
| 6,435,599 B2 | 8/2002 | Than | |
| 6,478,361 B1 | 11/2002 | Wood | |
| 6,513,856 B1 | 2/2003 | Swanson et al. | |
| 6,527,331 B2 | 3/2003 | Searfoss | |
| 6,595,594 B2 | 7/2003 | Royer | |
| 6,655,726 B2 | 12/2003 | Bergeron | |
| 6,715,817 B2 | 4/2004 | Nolan et al. | |
| 6,779,828 B1 | 8/2004 | Poyntz | |
| 6,783,168 B2 * | 8/2004 | Searfoss | B60J 7/085 296/100.11 |
| 6,805,395 B2 | 10/2004 | Royer | |
| 6,886,879 B2 | 5/2005 | Nolan et al. | |
| 6,905,161 B2 | 6/2005 | Fliege et al. | |
| 6,926,337 B2 | 9/2005 | Poyntz | |
| 7,189,042 B1 | 3/2007 | Schmit | |
| 7,506,912 B2 | 3/2009 | Royer | |
| 7,513,561 B2 | 4/2009 | Royer | |
| 7,549,695 B2 | 6/2009 | Royer | |
| 8,177,284 B1 | 5/2012 | Royer | |
| 8,641,123 B1 | 2/2014 | Royer | |
| 8,998,287 B2 * | 4/2015 | Smith | B60J 7/085 296/98 |
| 9,272,610 B2 * | 3/2016 | Schmeichel | B60J 7/085 |
| 10,675,957 B2 * | 6/2020 | Royer | B60P 7/04 |
| 10,696,145 B2 * | 6/2020 | Hunter | B60J 7/085 |
| 2002/0021018 A1 | 2/2002 | Royer | |
| 2002/0043816 A1 | 4/2002 | Johnston | |
| 2002/0109371 A1 | 8/2002 | Wheatley | |
| 2002/0135199 A1 | 9/2002 | Hanning | |
| 2003/0052506 A1 | 3/2003 | Royer | |
| 2003/0090124 A1 * | 5/2003 | Nolan | B60J 7/085 296/98 |
| 2003/0190209 A1 | 8/2003 | Smith | |
| 2004/0195858 A1 | 10/2004 | Martin | |
| 2008/0217952 A1 * | 9/2008 | Royer | B60J 7/085 296/98 |
| 2010/0230994 A1 * | 9/2010 | Royer | B60J 7/085 296/100.16 |
| 2010/0320798 A1 | 12/2010 | Huotari et al. | |
| 2011/0254310 A1 | 10/2011 | Royer | |
| 2011/0298242 A1 * | 12/2011 | Schmeichel | B60J 7/085 296/98 |
| 2016/0332557 A1 | 11/2016 | Royer | |
| 2020/0298689 A1 * | 9/2020 | Royer | B60J 7/085 |
| 2021/0188062 A1 * | 6/2021 | Boutin | B60J 7/085 |

* cited by examiner

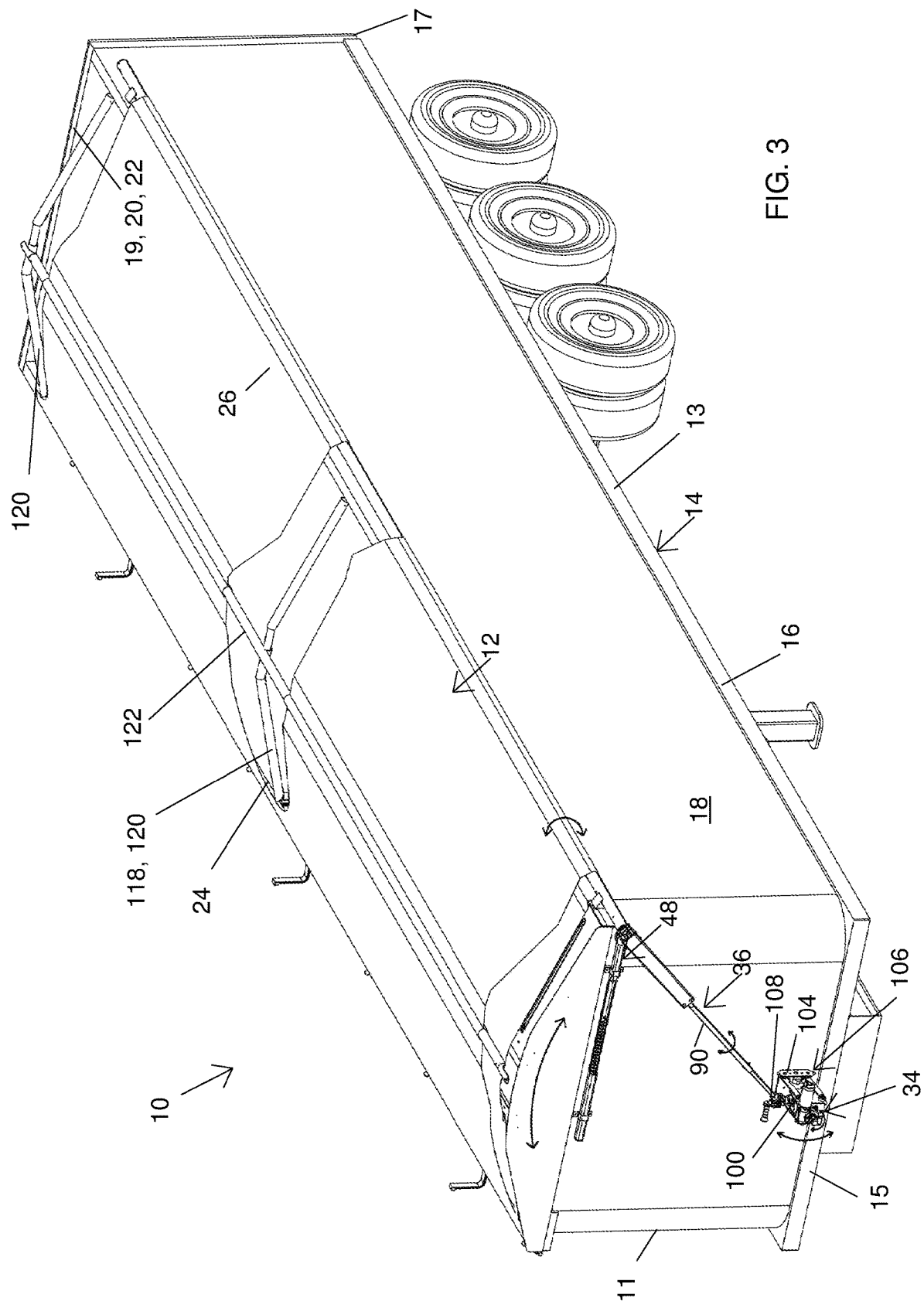

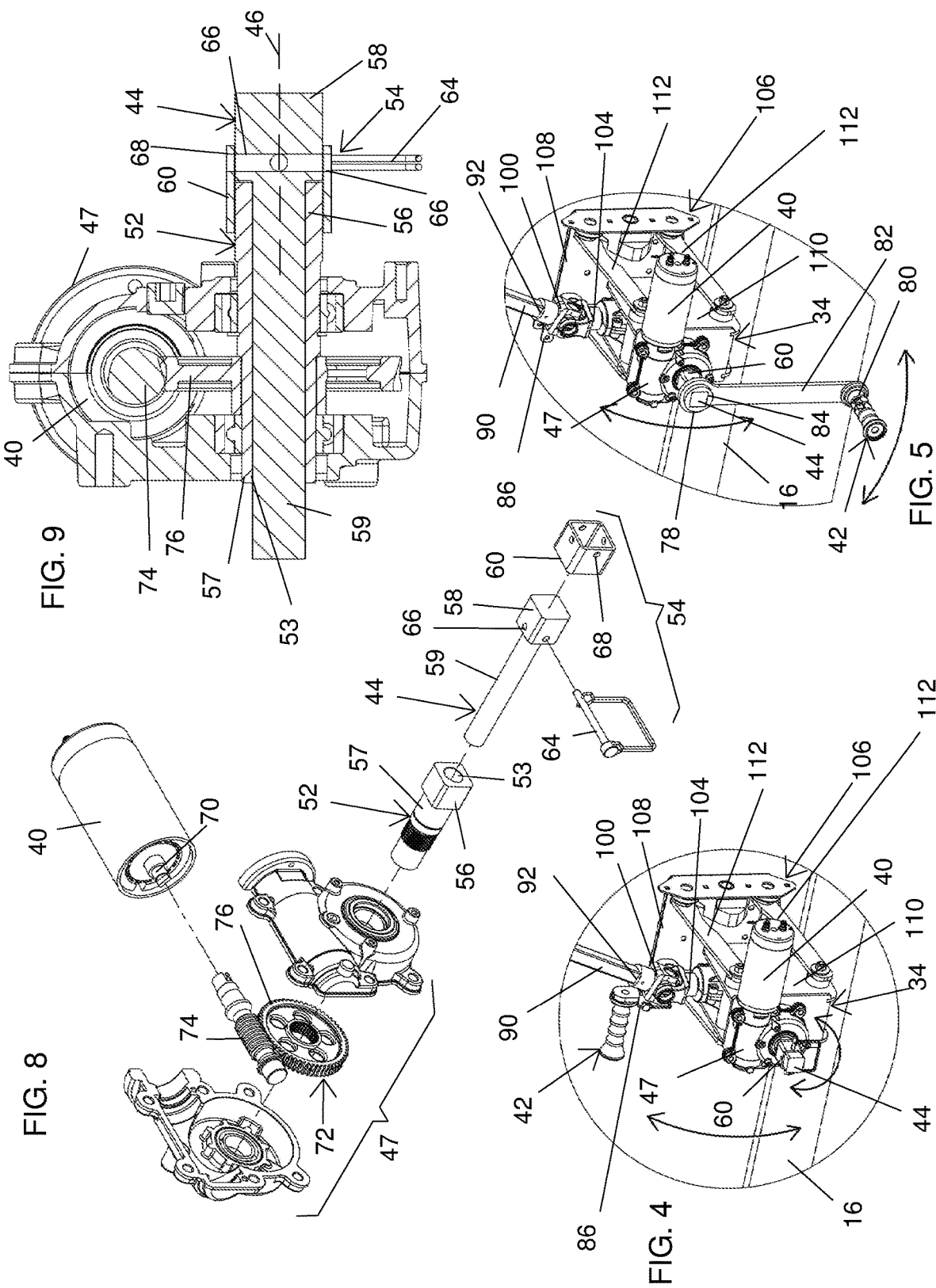

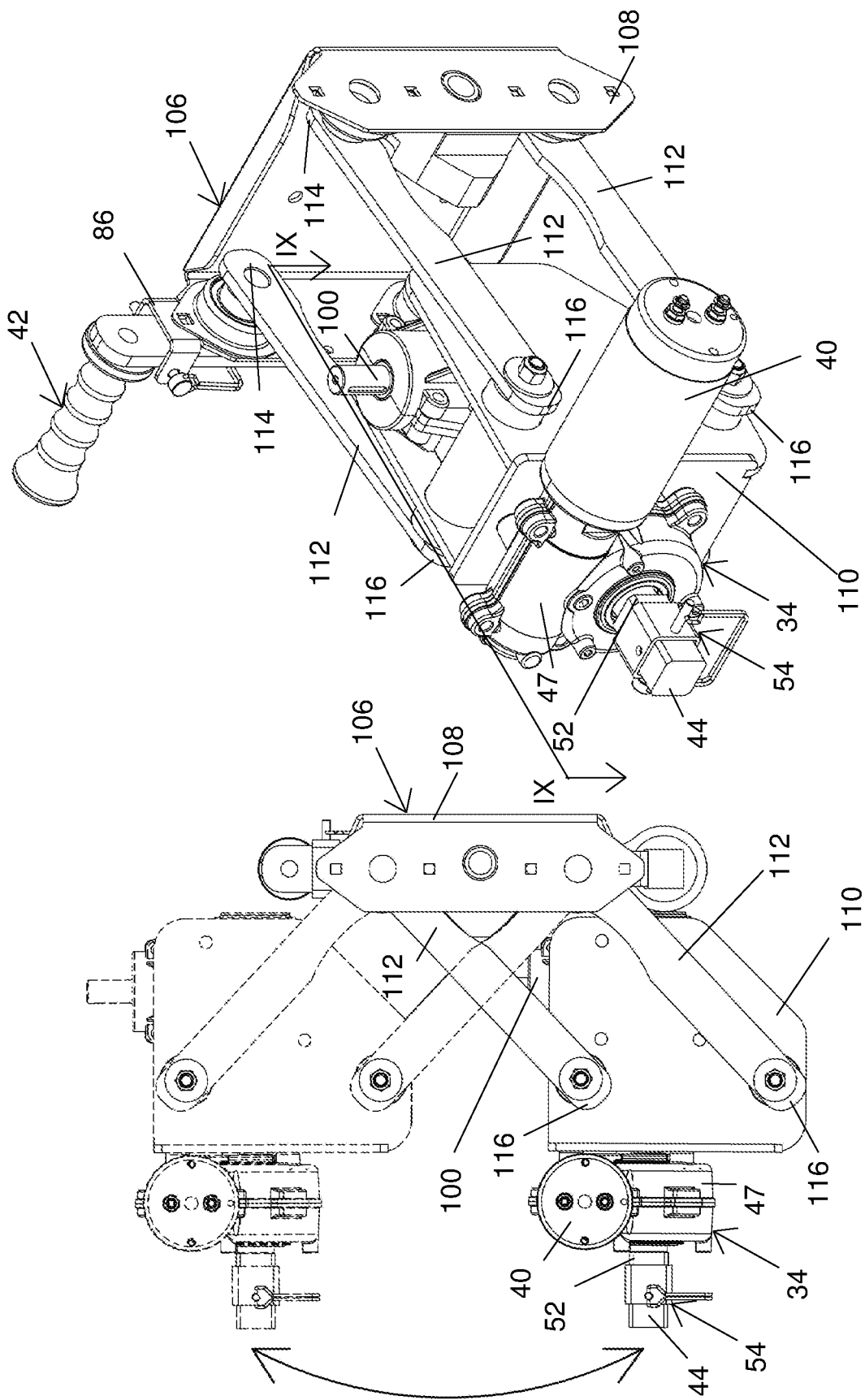

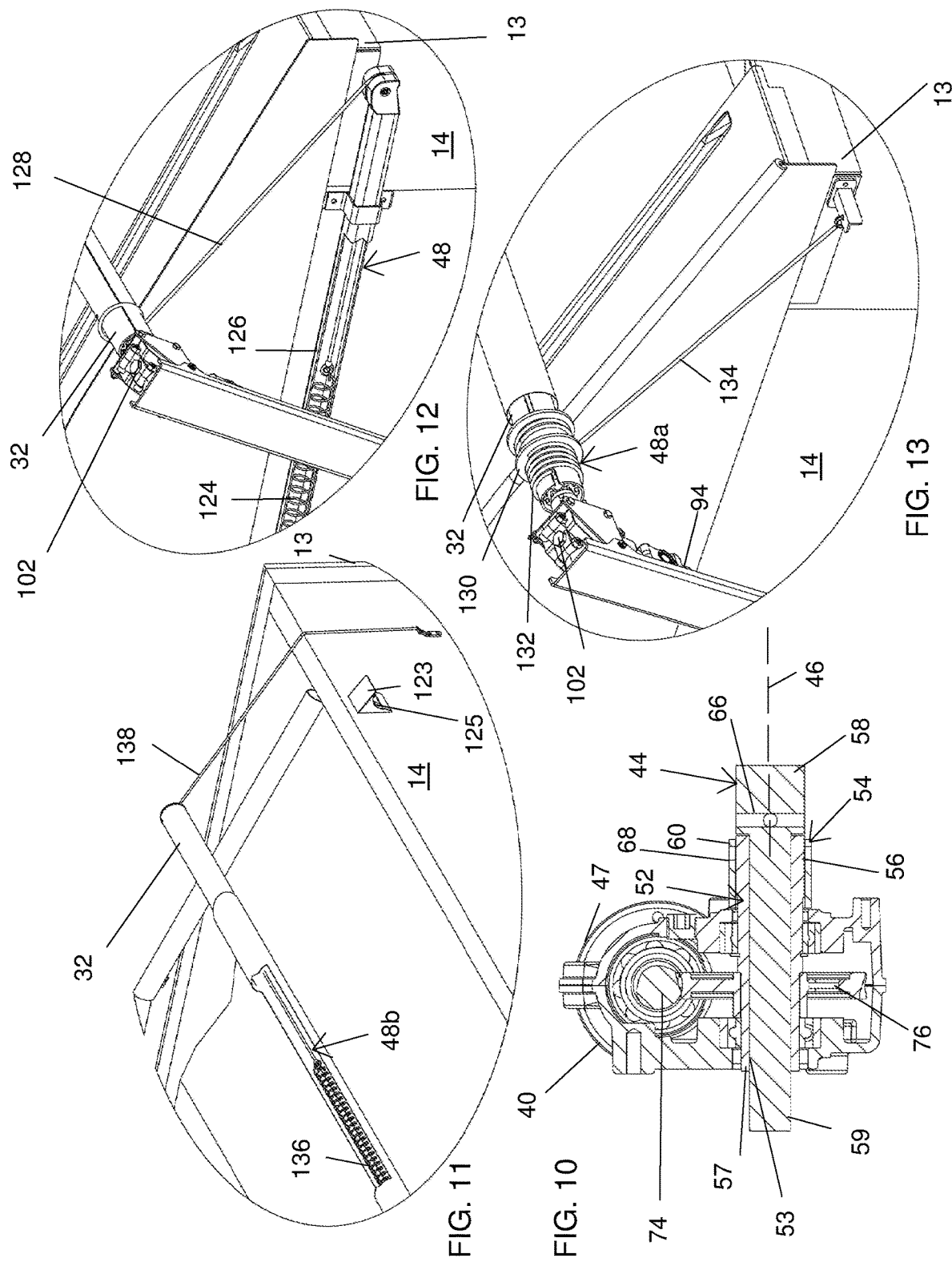

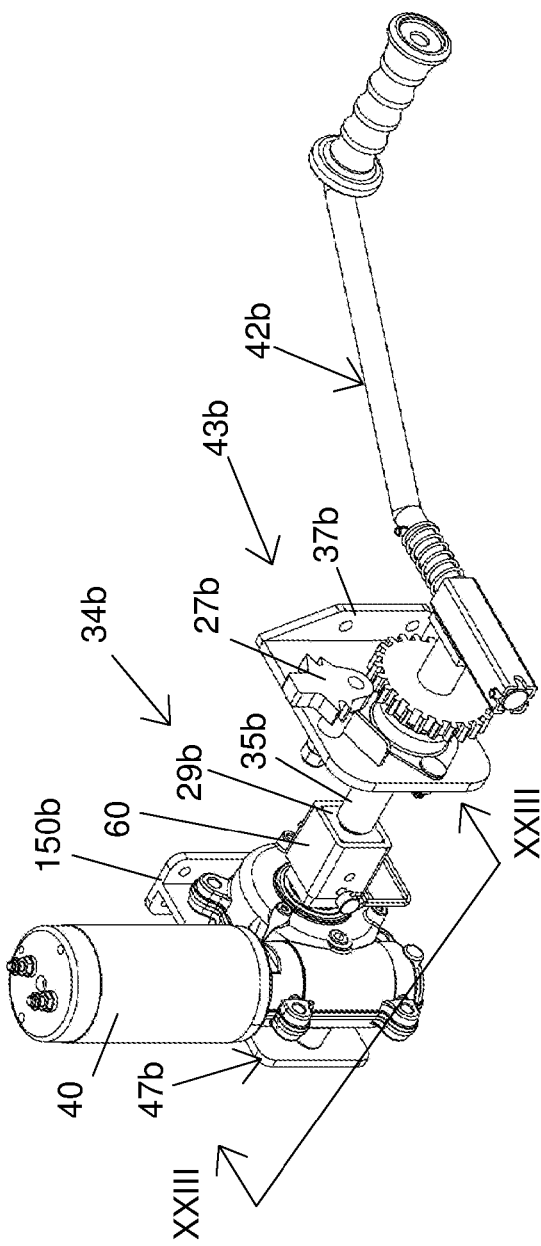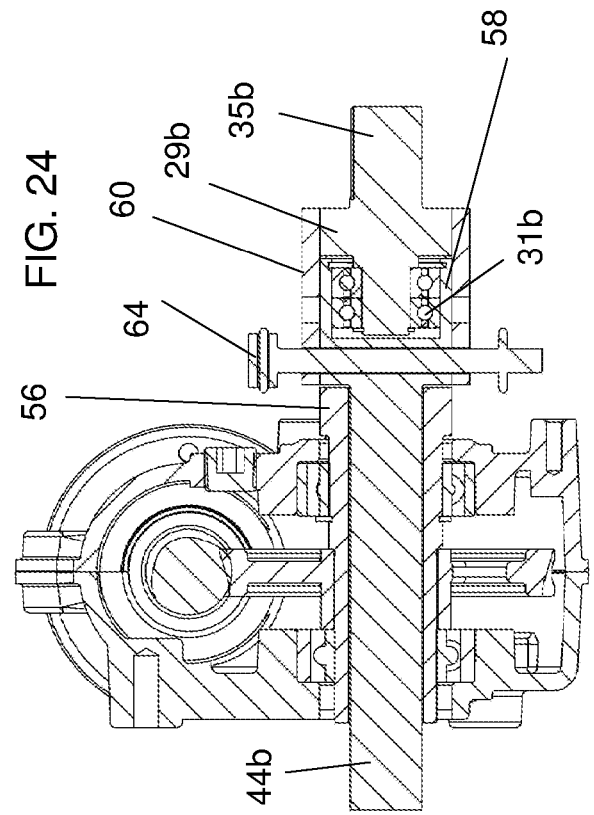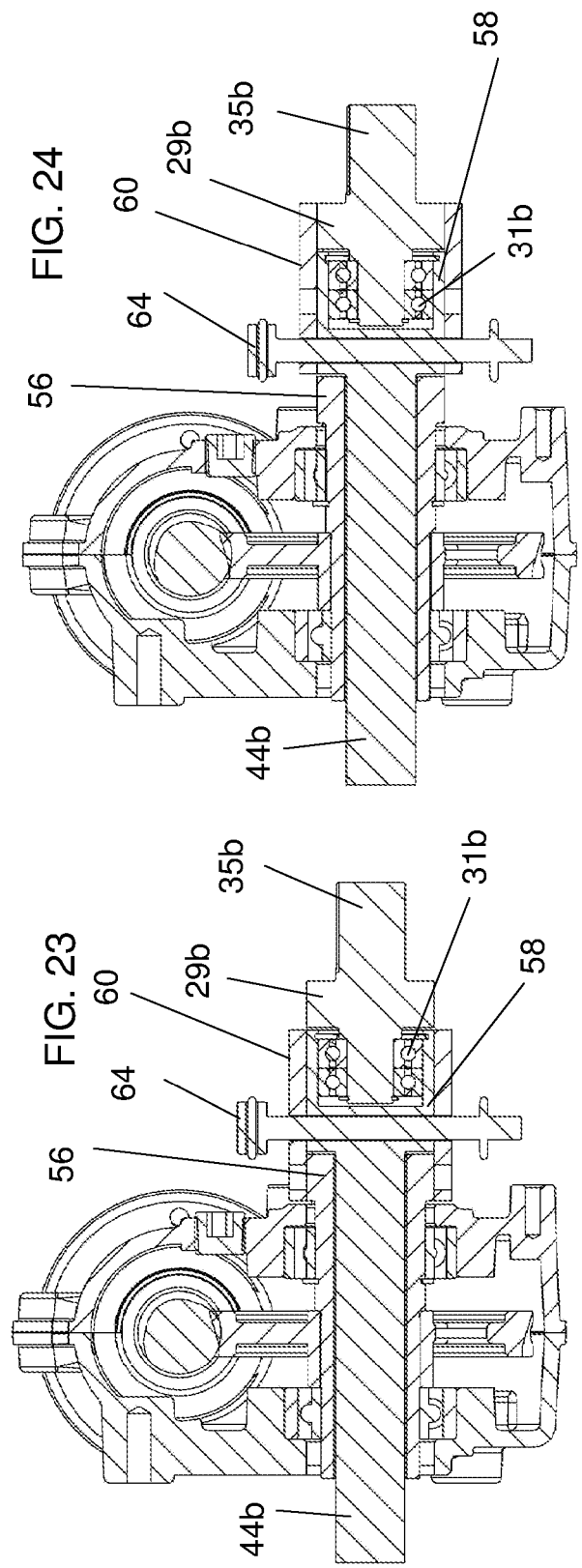

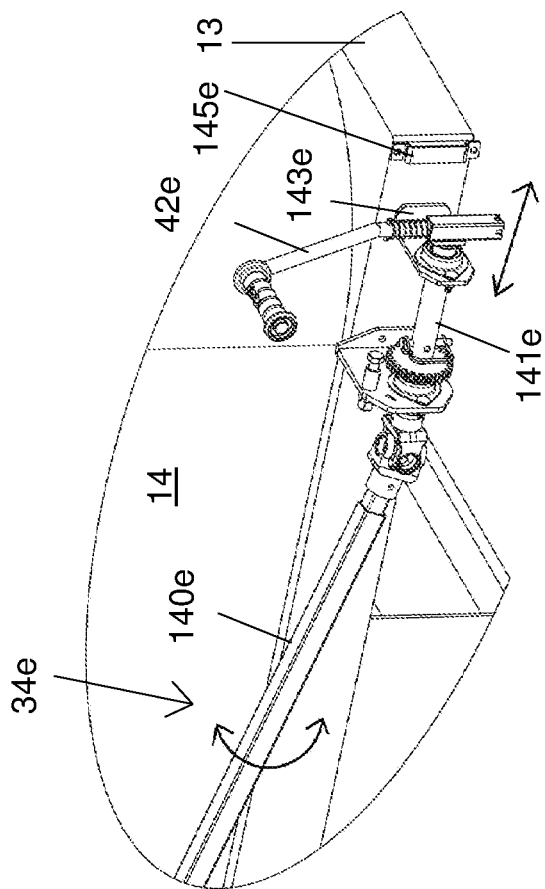
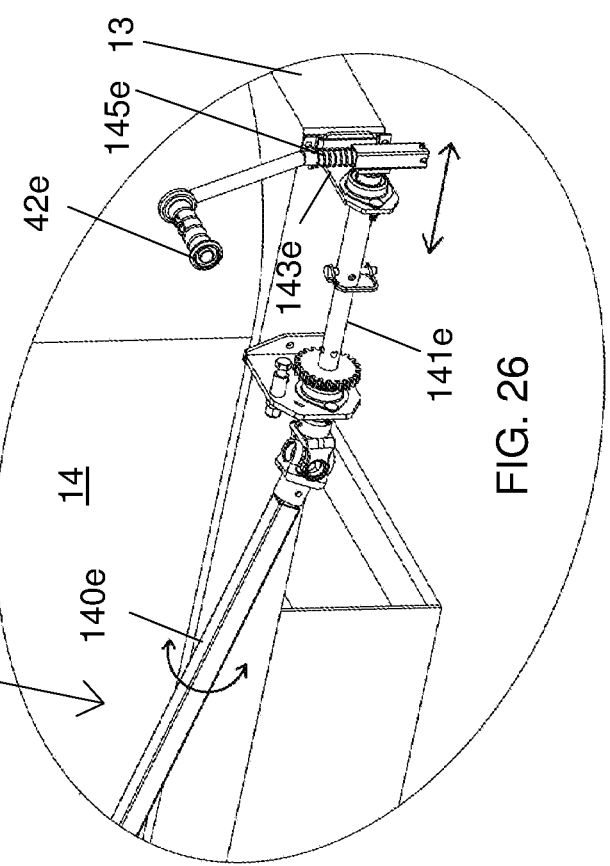

TARPAULIN RETRACTION AND EXTENSION DEVICE

FIELD OF THE INVENTION

The present invention relates generally to the field of transportation, and, more particularly, to a tarpaulin retraction and extension device usable for example with open top vehicle mounted containers.

BACKGROUND

There are many systems for covering top apertures of truck-movable containers, such as open top truck trailers and the bin of dump trucks. Many such systems conveniently roll a tarpaulin covering the top aperture around a rod when the top aperture is uncovered. To facilitate operation of these system, many are provided with an electric motor. However, if the motor fails, the system becomes inoperable.

Against this background, there exists a need for an improved tarpaulin extension and retraction device. An object of the present invention is to provide such a device.

SUMMARY OF THE INVENTION

In a broad aspect there is provided a device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising: a rod defining a rod longitudinal axis, the rod being movable between rod first and second positions wherein the rod is respectively substantially adjacent the aperture first and second ends, the tarpaulin being mountable to the rod at the tarpaulin second end to allow rolling of the tarpaulin thereonto and unrolling of the tarpaulin therefrom when the rod is rotated about the rod longitudinal axis; an actuator assembly, the actuator assembly including a motor, a crank, and a driving shaft defining a substantially longitudinal driving shaft rotation axis, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor; and a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis. Rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

There may also be provided a device further comprising a biasing element operatively coupled to the rod for biasing the rod towards the rod second position.

There may also be provided a device wherein the actuator assembly includes an intermediate shaft mechanically coupled to the motor so as to be rotatable thereby, the intermediate shaft defining a shaft passageway extending longitudinally therethrough coaxially with the driving shaft rotation axis, the driving shaft extending in the shaft passageway and protruding therefrom, the actuator assembly further comprising a shaft coupling element movable between coupling and uncoupling configurations, wherein in the coupling configuration, the shaft coupling element couples the intermediate shaft and driving shaft to each other so that the motor and driving shafts are jointly rotatable about the driving shaft rotation axis, and in the uncoupling configuration, the driving shaft is rotatable about the driving shaft rotation axis independently from the intermediate shaft.

There may also be provided a device wherein the intermediate shaft defines an intermediate shaft coupling portion and the driving shaft defines a driving shaft coupling portion, the shaft coupling element securing the intermediate and driving shaft coupling portions to each other in the coupling configuration.

There may also be provided a device wherein the intermediate and driving shaft coupling portions are substantially adjacent to each other.

There may also be provided a device wherein the shaft coupling element includes a collar, the collar receiving thereinto and overlapping at least part of each of the intermediate and driving shaft coupling portions in the locking configurations.

There may also be provided a device wherein the intermediate and driving shaft coupling portions each have a transversal cross-sectional configuration lacking continuous rotational symmetry.

There may also be provided a device wherein the intermediate and driving shaft coupling portions each have a substantially polygonal transversal cross-sectional configuration.

There may also be provided a device wherein the shaft coupling element is selectively lockable in the coupling configuration.

There may also be provided a device wherein the shaft coupling element also includes a locking pin, the driving shaft coupling portions defining a pin receiving aperture extending laterally therethrough, the collar defining a pair of collar apertures extending laterally therethrough laterally opposed to each other, wherein, in the coupling configuration, the collar apertures are in register with the pin receiving aperture and the locking pin is insertable through both the collar apertures and the pin receiving aperture to lock the shaft coupling element in the coupling configuration.

There may also be provided a device wherein the crank is removably mountable to a protruding portion of the driving shaft that protrudes from the intermediate shaft opposite to the transmission.

There may also be provided a device wherein the device defines a crank receiving element for receiving the crank thereinto when the crank is detached from the protruding portion.

There may also be provided a device wherein the driving shaft is provided with a driving shaft gear extending circumferentially therearound, the crank being part of a crank assembly including a crank gear and a crank assembly body, the crank being operatively coupled to the crank gear for selectively rotating the crank gear relative to the crank assembly body, the crank assembly body being mountable to a remainder of the actuator assembly so that the crank and driving shaft gears are engaged with each other so that rotation of the crank causes rotation of the driving shaft.

There may also be provided a device further comprising a worm gear between the motor and the intermediate shaft coupling the motor and the intermediate shaft to each other so that the motor can rotate the intermediate shaft.

There may also be provided a device wherein the worm gear includes a worm driven by the motor and a worm wheel extending radially outwardly from the intermediate shaft and jointly rotatable therewith.

There may also be provided a device wherein the transmission assembly is configured and sized so that a distance between the driving shaft and the rod remains substantially constant as the rod moves between the rod first and second positions.

There may also be provided a device further comprising a mounting bracket secured to the actuator and transmission assemblies for mounting the actuator and transmission assemblies to the container peripheral wall, the mounting bracket being configured and sized for allowing vertical movements of the actuator and transmission assemblies relative to the container peripheral wall.

There may also be provided a device wherein the mounting bracket includes a base fixedly securable to the container peripheral wall and a pair of levers extending substantially parallel to each other and vertically spaced apart from each other, each lever being pivotally mounted at one end thereof to the base and pivotally mounted at another end thereof to one of the motor and transmission assemblies.

There may also be provided a device wherein the transmission assembly includes an elongated arm defining an arm longitudinal axis, the arm defining substantially opposed arm first and second ends, the arm first end being substantially adjacent to the driving shaft and the arm second end being substantially adjacent to the rod, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions.

There may also be provided a device wherein the arm is a fixed length arm.

There may also be provided a device wherein the transmission assembly includes a first 90 degrees gearbox between the arm and the driving shaft and a second 90 degrees gearbox between the arm and the rod, the arm being coupled to the first 90 degrees gearbox using a universal joint to allow pivotal movement of the arm between the arm first and second positions as the rod moves between the rod first and second positions.

In another broad aspect, there is provided a covered vehicle container, comprising: a container defining a container bottom wall, a container top aperture above the container bottom wall, opposed container first and second ends and opposed container first and second sides each extending between the container first and second ends, the container defining at least one tarpaulin support extending between the container first and second ends across the container top aperture; a tarpaulin defining tarpaulin first and second ends, the tarpaulin being secured to the container first end substantially adjacent to the tarpaulin first end, the tarpaulin being movable between tarpaulin retracted and extended configurations in which the tarpaulin is respectively substantially retracted from the container top aperture and extended across the container top aperture; and a device for handling the tarpaulin, the device including: a rod defining a rod longitudinal axis, the rod being movable between rod first and second positions wherein the rod is respectively substantially adjacent the container first and second ends, the tarpaulin being mountable to the rod at the tarpaulin second end to allow rolling of the tarpaulin thereonto and unrolling of the tarpaulin therefrom when the rod is rotated about the rod longitudinal axis; an actuator assembly, the actuator assembly including a motor, a crank, and a driving shaft defining a substantially longitudinal driving shaft rotation axis, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor; a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis; and a biasing element operatively coupled to the rod for biasing the rod towards the rod second position. Rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

There may also be provided a covered vehicle container wherein the actuator assembly includes an intermediate shaft mechanically coupled to the motor so as to be rotatable thereby, the intermediate shaft defining a shaft passageway extending longitudinally therethrough coaxially with the driving shaft rotation axis, the driving shaft extending in the shaft passageway and protruding therefrom, the actuator assembly further comprising a shaft coupling element movable between coupling and uncoupling configurations, wherein in the coupling configuration, the shaft coupling element couples the intermediate shaft and driving shaft to each other so that the motor and driving shafts are jointly rotatable about the driving shaft rotation axis, and in the uncoupling configuration, the driving shaft is rotatable about the driving shaft rotation axis independently from the intermediate shaft.

There may also be provided a covered vehicle container wherein the intermediate shaft defines an intermediate shaft coupling portion and the driving shaft defines a driving shaft coupling portion, the shaft coupling element securing the intermediate and driving shaft coupling portions to each other in the coupling configuration.

There may also be provided a covered vehicle container wherein the intermediate and driving shaft coupling portions are substantially adjacent to each other and wherein the shaft coupling element includes a collar, the collar receiving thereinto and overlapping at least part of each of the intermediate and driving shaft coupling portions in the locking configurations.

There may also be provided a covered vehicle container wherein the crank is removably mountable to a protruding portion of the driving shaft that protrudes from the intermediate shaft opposite to the transmission.

There may also be provided a covered vehicle container wherein the driving shaft is provided with a driving shaft gear extending circumferentially around part thereof, the crank being part of a crank assembly including a crank gear and a crank assembly body, the crank being operatively coupled to the crank gear for selectively rotating the crank gear relative to the crank assembly body, the crank assembly body being removable mountable to a remainder of the drive assembly so that the crank and driving shaft gear are engaged to each other so that rotation of the crank is causes rotation the driving shaft.

There may also be provided a covered vehicle container further comprising a worm gear between the motor and the intermediate shaft coupling the motor and the intermediate shaft to each other so that the motor can rotate the intermediate shaft.

There may also be provided a covered vehicle container wherein the transmission assembly includes an elongated arm defining an arm longitudinal axis, the arm defining substantially opposed arm first and second ends, the arm first end being substantially adjacent to the container bottom wall and the arm second end being substantially adjacent to the container top aperture, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions.

There may also be provided a covered vehicle container wherein the arm is a fixed length arm.

There may also be provided a covered vehicle container further comprising a mounting bracket, the mounting bracket including a base fixedly mounted to the container and a bracket mobile portion movable vertically relative to the container, the arm being mechanically coupled to the bracket mobile portion at the arm first end so that the arm first end is vertically movable along with the bracket mobile portion.

There may also be provided a covered vehicle container wherein the mounting bracket includes a pair of levers extending substantially parallel to each other and vertically spaced apart from each other, each lever being pivotally mounted at one end thereof to the base and pivotally mounted at another end thereof to the bracket mobile portion.

There may also be provided a covered vehicle container wherein the actuator assembly is mounted to the bracket mobile portion.

There may also be provided a covered vehicle container wherein the base is mounted to the container on the container first side.

There may also be provided a covered vehicle container wherein the base is mounted substantially midway between the container first and second ends.

There may also be provided a covered vehicle container wherein the actuator assembly is mounted to the container substantially adjacent to one of the container first and second ends, the transmission including an intermediate gearbox and an extension shaft, the extension shaft extending between the driving shaft and the intermediate gearbox, the intermediate gearbox being mounted to the bracket mobile portion, and the arm being mounted to the intermediate gearbox, the actuator assembly, extension shaft, intermediate gearbox and arm being mechanically coupled to each other so that rotation of the driving shaft about the shaft longitudinal axis causes rotation of the arm about the arm longitudinal axis.

There may also be provided a covered vehicle container wherein the actuator assembly includes a crank assembly, the crank assembly including the crank and a crank assembly shaft axially rotatable by the crank, the crank assembly shaft being coupled to the driving shaft axially through a bearing opposed to the crank, the bearing allowing the crank assembly shaft and the driving shaft to rotate freely relative to each other, the actuator assembly including a collar 60 selectively movable so as to overlap jointly both the crank assembly shaft and driving shaft, the collar, crank assembly shaft and driving shaft being configured and sized so that with the collar overlapping the crank assembly shaft and driving shaft, the crank assembly shaft and driving shaft are jointly rotatable.

There may also be provided a covered vehicle container wherein the collar is further selectively movable so that the crank assembly shaft and driving shaft are rotatable independently from each other.

There may also be provided a covered vehicle container wherein the motor and the driving shaft are mounted to the bracket mobile portion, the actuator assembly further including a crank shaft provided substantially adjacent one of the container first and second ends, the crank being mounted to the crank shaft so as to rotate the latter about a crank shaft rotation axis, and extension shaft being provided between the crank shaft and the driving shaft to transmit rotations of the crank shaft to the driving shaft to rotate the latter.

There may also be provided a covered vehicle container wherein the extension shaft is coupled to the driving and crank shafts with universal joints.

There may also be provided a covered vehicle container wherein the transmission assembly includes a first 90 degrees gearbox between the arm and the driving shaft and a second 90 degrees gearbox between the arm and the rod, the arm being coupled to the first 90 degrees gearbox using a universal joint to allow pivotal movement of the arm between the arm first and second positions as the rod moves between the rod first and second positions.

There may also be provided a covered vehicle container further comprising a support rod mounted to the tarpaulin so as to extend substantially laterally thereacross at a location intermediate the tarpaulin first and second ends.

There may also be provided a covered vehicle container wherein the at least one tarpaulin support includes at least two arches spaced apart from each other and each extending across the container top aperture between the container first and second ends.

In yet another broad aspect, there is provided a device for handling a tarpaulin over a container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising: a rod defining a rod longitudinal axis, the rod being movable between rod first and second positions wherein the rod is respectively substantially adjacent the aperture first and second end, the tarpaulin being mountable to the rod at the tarpaulin second end to allow rolling of the tarpaulin thereonto and unrolling of the tarpaulin therefrom when the rod is rotated about the rod longitudinal axis; an actuator assembly, the actuator assembly including a motor, a crank, and a driving shaft defining a substantially longitudinal driving shaft rotation axis, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor; a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis, the transmission assembly including an elongated arm defining an arm longitudinal axis, the arm defining substantially opposed arm first and second ends, the arm first end being substantially adjacent to the driving shaft and the arm second end being substantially adjacent to the container top aperture, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions; and a biasing element operatively coupled to the rod for biasing the rod towards the rod second position. Rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

In yet another broad aspect, there is provided an actuator assembly, the actuator assembly including a motor, a crank, and a driving shaft defining a substantially longitudinal driving shaft rotation axis, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor.

There may also be provided an actuator assembly wherein the actuator assembly includes an intermediate shaft mechanically coupled to the motor so as to be rotatable thereby, the intermediate shaft defining a shaft passageway extending longitudinally therethrough coaxially with the driving shaft rotation axis, the driving shaft extending in the shaft passageway and protruding therefrom, the actuator assembly further comprising a shaft coupling element movable between coupling and uncoupling configurations, wherein in the coupling configuration, the shaft coupling element couples the intermediate shaft and driving shaft to each other so that the motor and driving shafts are jointly rotatable about the driving shaft rotation axis, and in the uncoupling configuration, the driving shaft is rotatable about the driving shaft rotation axis independently from the intermediate shaft.

There may also be provided an actuator assembly wherein the intermediate shaft defines an intermediate shaft coupling portion and the driving shaft defines a driving shaft coupling portion, the shaft coupling element securing the intermediate and driving shaft coupling portions to each other in the coupling configuration.

There may also be provided an actuator assembly wherein the intermediate and driving shaft coupling portions are substantially adjacent to each other.

There may also be provided an actuator assembly wherein the shaft coupling element includes a collar, the collar receiving thereinto and overlapping at least part of each of the intermediate and driving shaft coupling portions in the locking configurations.

There may also be provided an actuator assembly wherein the intermediate and driving shaft coupling portions each have a transversal cross-sectional configuration lacking continuous rotational symmetry.

There may also be provided an actuator assembly wherein the intermediate and driving shaft coupling portions each have a substantially polygonal transversal cross-sectional configuration.

There may also be provided an actuator assembly wherein the shaft coupling element is selectively lockable in the coupling configuration.

There may also be provided an actuator assembly wherein the shaft coupling element also includes a locking pin, the driving shaft coupling portions defining a pin receiving aperture extending laterally therethrough, the collar defining a pair of collar apertures extending laterally therethrough laterally opposed to each other, wherein, in the coupling configuration, the collar apertures are in register with the pin receiving aperture and the locking pin is insertable through both the collar apertures and the pin receiving aperture to lock the shaft coupling element in the coupling configuration.

In yet another broad aspect, the invention provides a device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising: a rod defining a rod longitudinal axis, the rod being movable between rod first and second positions wherein the rod is respectively substantially adjacent the aperture first and second ends, the tarpaulin being mountable to the rod at the tarpaulin second end to allow rolling of the tarpaulin thereonto and unrolling of the tarpaulin therefrom when the rod is rotated about the rod longitudinal axis; an actuator assembly, the actuator assembly including an actuator and a driving shaft rotatable about a longitudinal driving shaft rotation axis by the actuator; and a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis by the actuator causes rotation of the rod about the rod longitudinal axis, the transmission assembly including an elongated arm defining an arm longitudinal axis, the arm defining substantially opposed arm first and second ends, the arm first end being substantially adjacent to the container bottom wall and the arm second end being substantially adjacent to the container top aperture, the arm being operatively coupled to the driving shaft and rod so that rotation of the driving shaft about the driving shaft rotation axis by the actuator causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions. Wherein rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

There may also be provided a device wherein the arm is a fixed length arm.

There may also be provided a device wherein the transmission assembly includes a first 90 degrees gearbox between the arm and the driving shaft and a second 90 degrees gearbox between the arm and the rod, the arm being coupled to the first 90 degrees gearbox using a universal joint to allow pivotal movement of the arm between the arm first and second positions as the rod moves between the rod first and second positions.

There may also be provided a device wherein the actuator assembly includes a crank operatively coupled to the driving shaft for rotating the driving shaft about the driving shaft rotation axis.

There may also be provided a device further comprising a mounting bracket secured to the actuator and transmission assemblies for mounting the actuator and transmission assemblies to the container, the mounting bracket being configured and sized for allowing vertical movements of the arm relative to the container peripheral wall.

There may also be provided a device wherein the mounting bracket includes a base fixedly mountable to the container and a bracket mobile portion movable vertically relative to the base, the arm being mechanically coupled to the bracket mobile portion at the arm first end so that the arm first end is vertically movable along with the bracket mobile portion.

There may also be provided a device wherein the transmission assembly includes a universal joint between the bracket mobile portion and the arm for allowing pivotal movements of the arm relative to the mounting bracket.

Advantageously, in some embodiments, the proposed device can be manufactured using a relatively small quantity of materials. When the electric motor is disengaged from the driving shaft, the crank can be used to operate the proposed device manually using the crank. The device can therefore be operated if the motor is not powered or if the motor fails. In some embodiments, change between the manual and motorized configurations is achieved using a relatively small number of ergonomic steps.

In some embodiments, the proposed device may automatically achieve the manual configuration from the motorized configuration when the crank is used, instead of requiring an action from the intended user.

In yet another broad aspect, there is provided a device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising: a rod defining a rod longitudinal axis, the rod being movable between rod first and second positions wherein the rod is respectively substantially adjacent the aperture first and second ends, the tarpaulin being mountable to the rod at the tarpaulin second end to allow rolling of the tarpaulin thereonto and unrolling of the tarpaulin therefrom when the rod is rotated about the rod longitudinal axis; an actuator assembly, the actuator assembly including an actuator and a driving shaft defining a substantially longitudinal driving shaft rotation axis, the actuator being mechanically coupled to the driving shaft for selectively rotating the driving shaft about the driving shaft rotation axis; and a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis; wherein the transmission assembly is configured and sized so that a distance between the driving shaft and the rod remains substantially constant as the rod moves between the rod first and second positions; and wherein rotating the rod using the actuator to roll the tarpaulin therearound moves the rod towards the rod first position to move the tarpaulin to the tarpaulin retracted configuration and rotating the rod using the actuator to unroll the tarpaulin therefrom moves the rod towards the rod second position to move the tarpaulin to the tarpaulin extended configuration.

In yet another broad aspect, there is provided a covered vehicle container, comprising: a container defining a container bottom wall, a container top aperture above the container bottom wall, opposed container first and second ends and opposed container first and second sides each extending between the container first and second ends, the container defining at least one tarpaulin support extending between the container first and second ends across the container top aperture; a tarpaulin defining tarpaulin first and second ends, the tarpaulin being secured to the container first end substantially adjacent to the tarpaulin first end, the tarpaulin being movable between tarpaulin retracted and extended configurations in which the tarpaulin is respectively substantially retracted from the container top aperture and extended across the container top aperture; and a device for handling the tarpaulin, the device including: a rod defining a rod longitudinal axis, the rod being movable between rod first and second positions wherein the rod is respectively substantially adjacent the container first and second ends, the tarpaulin being mounted to the rod at the tarpaulin second end to allow rolling of the tarpaulin thereonto and unrolling of the tarpaulin therefrom when the rod is rotated about the rod longitudinal axis; an actuator assembly, the actuator assembly including an actuator and a driving shaft defining a substantially longitudinal driving shaft rotation axis, the actuator being mechanically coupled to the driving shaft for selectively rotating the driving shaft about the driving shaft rotation axis; a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis; and a biasing element operatively coupled to the rod for biasing the rod towards the rod second position; wherein the transmission assembly includes an elongated arm defining an arm longitudinal axis, the arm being a fixed length arm and defining substantially opposed arm first and second ends, the arm first end being substantially adjacent to the container bottom wall and the arm second end being substantially adjacent to the container top aperture, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions; wherein the arm is operatively coupled to the container and to the actuator assembly at the arm first end so that a vertical distance between the arm first end and the container bottom wall is allowed to vary as the rod moves between the rod first and second positions; wherein rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 3, in a perspective view, illustrates the container and device of FIGS. 1 and 2, the tarpaulin being shown in the extended configuration;

FIG. 4, in a perspective view, illustrates an actuator assembly part of the device of FIGS. 1 to 3, the actuator assembly being shown in a motorized configuration;

FIG. 5, in a perspective view, illustrates the actuator assembly of FIG. 4, the actuator assembly being shown in a manual configuration;

FIG. 6, in a side elevation view, illustrates a mounting bracket part of the device of FIGS. 1 to 3, along with the actuator assembly of FIGS. 4 and 5 and part of a transmission assembly part of the device of FIGS. 1 to 3;

FIG. 7, in a perspective view, illustrates the mounting bracket of FIG. 6;

FIG. 8, in a partial perspective exploded view, illustrates the actuator assembly of FIGS. 4 and 5;

FIG. 9, in a cross-sectional view along section line IX-IX of FIG. 7, illustrates the actuator assembly of FIGS. 4, 5 and 8 in the motorized configuration;

FIG. 10, in a cross-sectional view along section line IX-IX of FIG. 7, illustrates the actuator assembly of FIGS. 4, 5, 8 and 9 in the manual configuration;

FIG. 11, in a partial perspective view, illustrates a first embodiment of a biasing element usable in the device of FIGS. 1 to 3;

FIG. 12, in a perspective view of bubble XII of FIG. 1, illustrates a second embodiment of a biasing element usable in the device of FIGS. 1 to 3;

FIG. 13, in a perspective view of bubble XIII of FIG. 1, illustrates a third embodiment of a biasing element usable in the device of FIGS. 1 to 3;

FIG. 22, in a perspective view, illustrates the actuator assembly of FIG. 21;

FIG. 23, in a cross-sectional view along section line XXIII-XXIII of FIG. 22, illustrates part of the actuator assembly of FIG. 21 in the motorized configuration;

FIG. 24, in a cross-sectional view along section line XXIII-XXIII of FIG. 22, illustrates part of the actuator assembly of FIG. 22 in the manual configuration;

FIG. 25, in a partial perspective view, illustrates yet an other alternative embodiment of an actuator assembly and a transmission assembly usable in the device of FIGS. 1 to 3 shown here with a crank extension shaft thereof in a retracted configuration; and FIG. 26, in a partial perspective view, the actuator assembly of FIG. 25 shown here with the crank extension shaft in an extended configuration;

DETAILED DESCRIPTION

Figure 1:
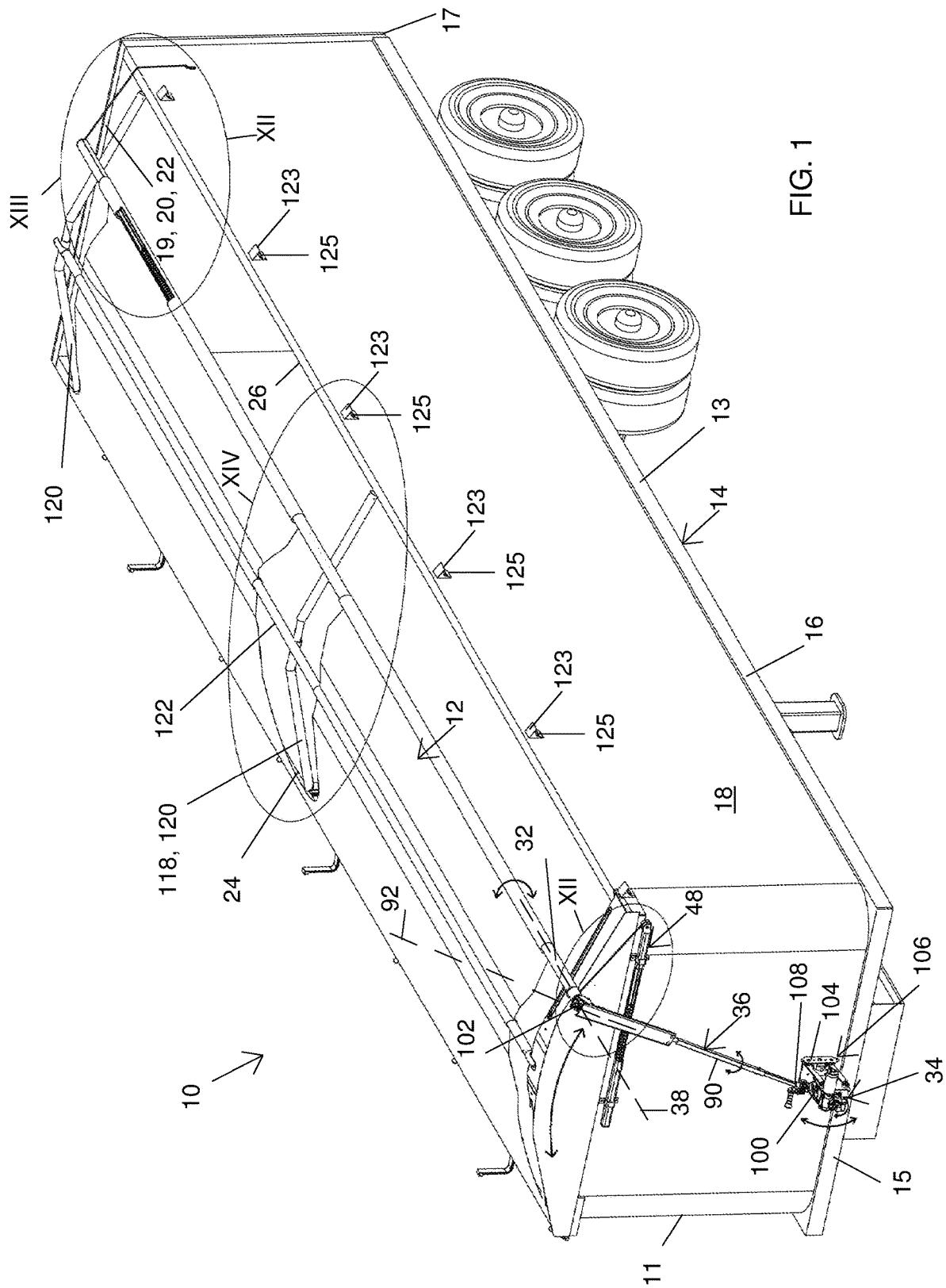
FIG. 1, in a perspective view, illustrates a container and a device for handling a tarpaulin to cover at least part of a container using the tarpaulin in accordance with an embodiment of the present invention, the tarpaulin being shown in a configuration intermediate a retracted configuration and an extend configuration.

Referring to FIG. 1 for example, there is shown a device 10 for handling a tarpaulin 12 to cover at least part of a container 14 using the tarpaulin 12. Typically, the container 14 defines a container bottom wall 16, a container peripheral wall 18 extending therefrom and a container top aperture 20 delimited by a container top edge 19 of the container peripheral wall 18 substantially opposed to the container bottom wall 16. The present invention is however also usable to cover other structures that may lack the container bottom wall 16 or part of the container peripheral wall 18.

The container top aperture 20 defines an aperture first end 24 and a substantially opposed aperture second end 26. The tarpaulin 12 defines a tarpaulin first end 28 and a substantially opposed tarpaulin second end 30, as seen for example in FIG. 15. The tarpaulin 12 is secured to the container 14 at the tarpaulin first end 28 substantially opposed to the aperture second end 26 and is movable between tarpaulin retracted and extended configurations in which the tarpaulin 12 is respectively substantially retracted from the container top aperture and 20 extended across the container top aperture 20, as seen respectively in FIGS. 2 and 3.

Returning to FIG. 1, the container 14 defines opposed container first and second ends 11 and 13 and opposed container first and second sides 15 and 17 each extending between the container first and second ends 11 and 13. The aperture first and second ends 24 and 26 are provided respectively at the container first and second ends 11 and 13.

The container 14 is typically part of a vehicle or a trailer to be pulled by a vehicle. For example, the container 14 is mountable on a platform truck, an open top truck trailer or the bin of a dump truck, among other possibilities. However, the device 10 is usable with other suitable containers 14. In some embodiments, the device 10 is usable to cover a railroad car.

Figure 2:
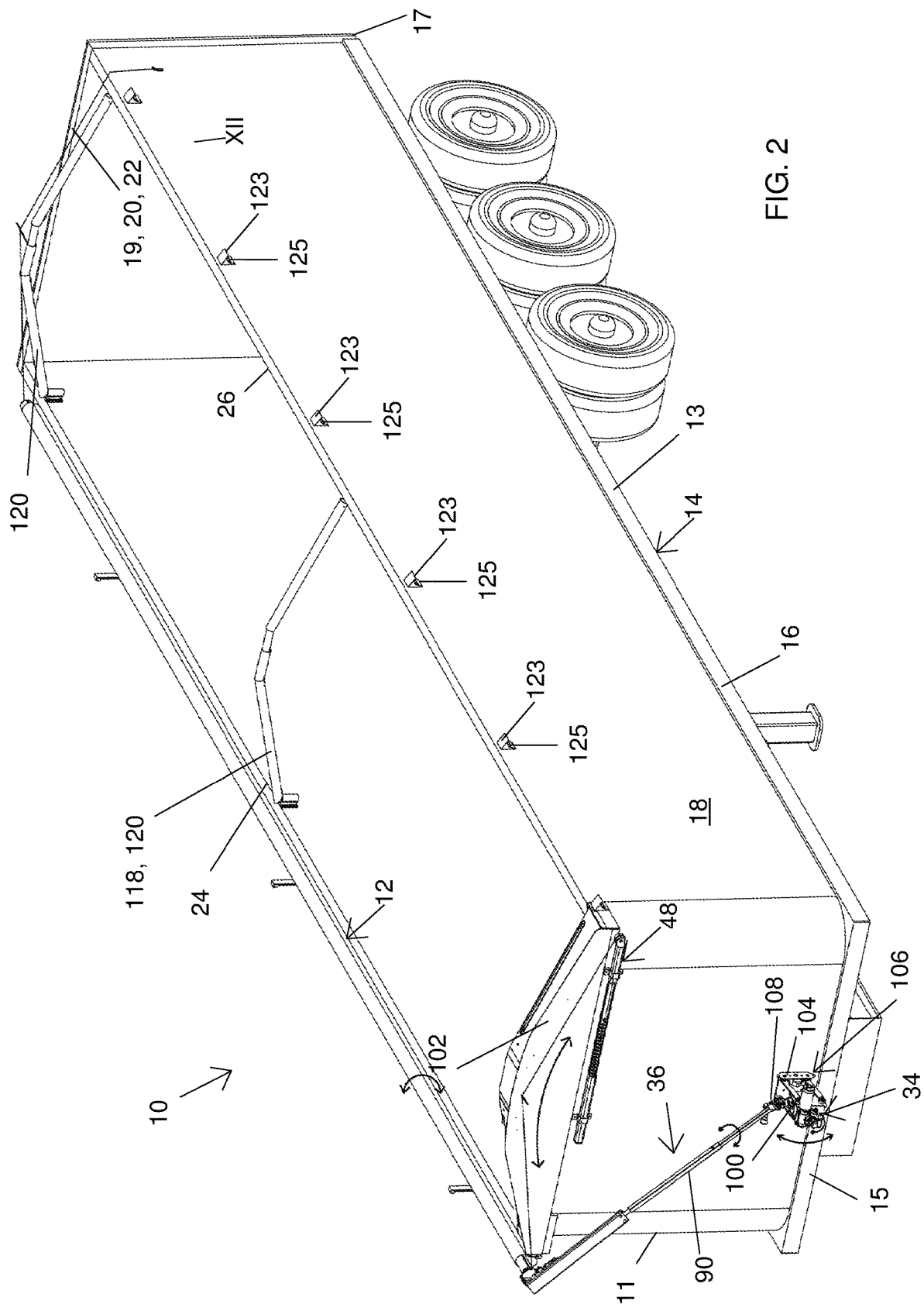
FIG. 2, in a perspective view, illustrates the container and device of FIG. 1, the tarpaulin being shown in the retracted configuration.
Figure 14:
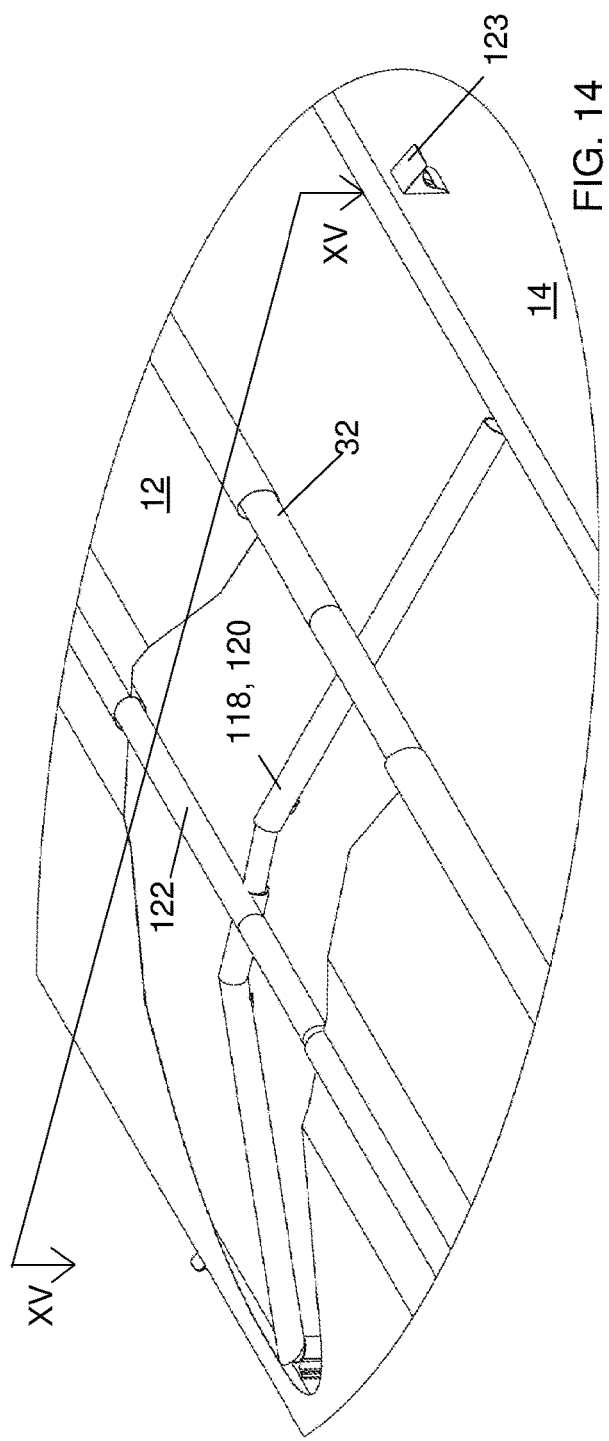
FIG. 14, in a perspective view of bubble XIV OF FIG. 1, illustrates an arch part of the container of FIGS. 1 to 3.

It should be noted that the aperture first and second ends 24 and 26 are not necessarily at the front or rear of the container 14, front and rear being related to the direction in which the container 14 is moved by the vehicle. As shown in the drawings, the aperture first and second ends 24 and 26 may be on edges of the container 14 that extend parallel to the direction of motion of the container 14 in typical operation. In the context of a movable container 14, FIGS. 1 to 3 illustrate a case in which the container 14 is moved in a direction perpendicular to a line joining the aperture first and second ends 24 and 26. The tarpaulin 12 is therefore retracted laterally relative to the direction of motion. However, it is within the scope of the invention to have tarpaulins 12 retractable along the direction of motion.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as below and horizontal, among others, is used in this document and refer to the device 10 and container 14 in a typical operational configuration. This terminology is used for clarity reasons and should not be used to restrict the scope of the appended claims unless explicitly mentioned in the claims.

The tarpaulin 12 may be directly secured to the container 14, or may be secured thereto indirectly, for example through anchoring straps (not shown in the drawings) that extend between the tarpaulin 12, at the tarpaulin first end 28 for example, and the container 14. When present, the anchoring straps are secured to the container 14, for example to the container peripheral wall 18 below the aperture first end 24. The tarpaulin 12 is secured to the container 14 substantially opposed to the aperture second end 26 so that when extended, the tarpaulin 12 extends across the container top aperture 20. To that effect, the tarpaulin 12 may be secured to the container peripheral wall 18 below the aperture first end 24 or adjacent the aperture first end 24, among other possibilities.

The device 10 includes a rod 32, an actuator assembly 34 and a transmission assembly 36. The transmission assembly 36 is provided between the rod 32 and the actuator assembly 34 and transmits rotation produced in the actuator assembly 34 to the rod 32 so that the latter can be used to extend and withdraw the tarpaulin 12.

More specifically, the rod 32 defines a rod longitudinal axis 38. The rod 32 is movable between rod first and second positions, seen respectively in FIGS. 2 and 3, wherein the rod 32 is respectively substantially adjacent the aperture first and second ends 24 and 26. The tarpaulin 12 is mountable to the rod 32 at the tarpaulin second end 30 to allow rolling of the tarpaulin 12 thereonto and unrolling of the tarpaulin 12 therefrom when the rod 32 is rotated about the rod longitudinal axis 38.

As seen for example in FIGS. 4 and 5, the actuator assembly 34 includes a motor 40, a crank 42, and a driving shaft 44 defining a substantially longitudinal driving shaft rotation axis 46. In some embodiments, but not necessarily, the actuator assembly 34 also includes an actuator body 47 to which the motor 40, crank 42, and driving shaft 44 are mounted. The actuator assembly 34 is configurable between a motorized configuration and a manual configuration, seen for example respectively in FIGS. 4 and 5. In the motorized configuration, the motor 40 is mechanically coupled to the driving shaft 44 for selectively rotating the driving shaft 44 about the driving shaft rotation axis 46 when the motor 40 is powered. In the manual configuration, the motor 40 is uncoupled from the driving shaft 44 and the crank 42 is mechanically coupled to the driving shaft 44 so that the crank 42 is usable to selectively rotate the driving shaft 44 independently of the motor 40. More details regarding the structure and operation of the actuator assembly 34 are provided hereinbelow.

The motor 40 is any suitable motor, such as for example and non-limitingly an electrical motor, an hydraulic motor or a pneumatic motor connected to a suitable power supply and to a controller (both not shown in the drawings) in a conventional manner. The controller allows to selectively cause the motor 40 to turn in a selected direction by suitably powering the motor 40, and to selectively remove power to the motor 40.

The transmission assembly 36 is provided between the actuator assembly 34 and the rod 32. The transmission assembly 36 is operatively coupled to the actuator assembly 34 and to the rod 32 for transmitting rotations of the driving shaft 44 to the rod 32 so that rotation of the driving shaft 44 about the driving shaft rotation axis 46 causes rotation of the rod 32 about the rod longitudinal axis 38. More details regarding the structure and operation of the transmission assembly 36 are provided hereinbelow.

Rotating the rod 32 using the actuator assembly 34 to roll the tarpaulin 12 therearound moves the rod 32 towards the rod first position to move the tarpaulin 12 to the tarpaulin retracted configuration. Rotating the rod 32 using the actuator assembly 34 to unroll the tarpaulin 12 therefrom moves the rod 32 towards the rod second position to move the tarpaulin 12 to the tarpaulin extended configuration. By selecting the manual or motorized configuration of the actuator assembly 34, the device 10 can be operated respectively manually, without an external power source, and motorized, by energizing the motor 40 with a suitable power source.

Returning to FIG. 1, typically, at least one biasing element 48 is operatively coupled to the rod 32 for biasing the rod 32 towards the rod second position. Indeed, in a typical embodiment, the tarpaulin 12 is not rigid enough to push the rod 32 towards the rod second position when the tarpaulin 12 is unrolled from the rod 32. Therefore, this movement must be caused separately, for example using the biasing element 48. However, in alternative embodiments, this movement may be provided in any other suitable manner, for example passively if the tarpaulin is rigid enough, or under the action of gravity if the top aperture peripheral edge 22 is slanted. In yet other embodiments, a motor may be used to move the rod 32 towards the rod second position. Movements of the rod 32 towards the rod first position are usually automatically achieved are rolling the tarpaulin 12 around the rod 32 reduces a distance between the rod and the aperture first end 24.

Referring to FIGS. 8, 9 and 10, an exemplary embodiment of the actuator assembly 34 is now described in greater details. The reader skilled in the art will appreciate that different actuator assemblies are within the scope of the appended claims. Non-limiting examples of alternative actuator assemblies are described hereinbelow.

In the actuator assembly 34, the motor 40 is not directly coupled to the driving shaft 44. Instead, the actuator assembly 34 includes an intermediate shaft 52 mechanically coupled to the motor 40 so as to be rotatable thereby and a shaft coupling element 54. The intermediate shaft 52 defines a shaft passageway 53 extending longitudinally therethrough coaxially with the driving shaft rotation axis 46. The driving shaft 44 extends in the shaft passageway 53 and protrudes therefrom. In the actuator assembly 34, the driving shaft 44 protrudes at both ends from the shaft passageway 53. However, in other embodiments the driving shaft 44 may protrude only at one end thereof from the shaft passageway 53.

The shaft coupling element 54 is movable between coupling and uncoupling configurations, seen respectively in FIGS. 9 and 10. In the coupling configuration, the shaft coupling element 54 couples the intermediate shaft 52 and driving shaft 44 to each other so that the motor 40 and driving shafts 44 are jointly rotatable about the driving shaft rotation axis 46. In the uncoupling configuration, the driving shaft 44 is rotatable about the driving shaft rotation axis 46 independently from the intermediate shaft 52, and therefore independently from the motor 40.

The shaft coupling element 54 may take any suitable form. The shaft coupling element 54 takes the form of an element that may selectively couple the driving and intermediate shafts 44 and 52 to each other so that the intermediate shafts 44 and 52 are jointly rotatable.

For example, and non-limitingly, intermediate shaft 52 defines an intermediate shaft coupling portion 56 and the driving shaft 44 defines a driving shaft coupling portion 58. The shaft coupling element 54 secures the intermediate and driving shaft coupling portions 56 and 58 to each other in the coupling configuration. In the uncoupling configuration, intermediate and driving shaft coupling portions 56 and 58 are free to rotate relative to each other. Typically, the intermediate and driving shaft coupling portions 56 and 58 are substantially adjacent to each other.

For example, the intermediate shaft 52 includes a substantially cylindrical intermediate shaft main portion 57 and the intermediate shaft coupling portion 56 extends integrally from the intermediate shaft main portion 57 at one end thereof so that the intermediate shaft main portion 57 and intermediate shaft coupling portion 56 are jointly rotatable. Similarly, the driving shaft 44 includes a substantially cylindrical driving shaft main portion 59 and the driving shaft coupling portion 58 extends integrally from the driving shaft main portion 59 at one end thereof so that the driving shaft main portion 59 and driving shaft coupling portion 58 are jointly rotatable. The driving shaft main portion 59 extends through the intermediate shaft coupling and main portions 56 and 57 and the driving shaft coupling portion 58 protrudes from the intermediate shaft 52.

In a specific embodiment, the shaft coupling element 54 includes a collar 60. The collar 60 receives thereinto and overlaps at least part of each of the intermediate and driving shaft coupling portions 56 and 58 in the coupling configuration. In the uncoupling configuration, the collar 60 is completely removed from the intermediate and driving shaft coupling portions 56 and 58, or overlaps only one of the intermediate and driving shaft coupling portions 56 and 58.

The collar 60 may be coupled to the intermediate and driving shaft coupling portions 56 and 58 in any suitable manner in the coupling configuration to ensure that the intermediate and driving shaft coupling portions 56 and 58 are jointly rotatable. For example, the intermediate and driving shaft coupling portions 56 and 58 each have a transversal cross-sectional configuration lacking continuous rotational symmetry, such as, for example and non-limitingly, a substantially polygonal transversal cross-sectional configuration. In other words, the intermediate and driving shaft coupling portions 56 and 58 each have a transversal cross-sectional configuration that differs from a circle. The collar 60 is hollow and substantially fittingly receives the intermediate and driving shaft coupling portions 56 and 58 so that in the coupling configuration, the collar 60 is jointly rotatable about the driving shaft rotation axis 46 along with the intermediate and driving shafts 52 and 44.

In some embodiments, the shaft coupling element 54 is selectively lockable in the coupling configuration. However, in other embodiments, this is not the case. More specifically, for example, the shaft coupling element 54 also includes a locking pin 64. At least one of the intermediate and driving shaft coupling portions 56 and 58, the driving shaft coupling portion 58 in the embodiment shown in the drawings, defines a pin receiving aperture 66 extending laterally therethrough and the collar 60 defines a pair of collar apertures 68 extending laterally therethrough laterally opposed to each other. In the coupling configuration, the collar apertures 68 are in register with the pin receiving aperture 66 and the locking pin 64 is insertable through both the collar apertures 68 and the pin receiving aperture 66 to lock the shaft coupling element 54 in the coupling configuration. Removing the locking pin 64 from the the collar apertures 68 and the pin receiving aperture 66 then allows to slide the collar 60 relative to the intermediate and driving shaft coupling portions 56 and 58 to achieve the uncoupling configuration.

The motor 40 is coupled to the intermediate shaft 52 in any suitable manner. For example, referring to FIG. 8, the motor 40 includes a motor output shaft 70 and a worm gear 72 extends between the motor output shaft 70 and the intermediate shaft 52 coupling the motor 40 and the intermediate shaft 52 to each other so that the motor 40 can rotate the intermediate shaft 52. The worm gear 72 includes a worm 74 driven by the motor output shaft 70 and a worm wheel 76 extending radially outwardly from the intermediate shaft 52 and jointly rotatable therewith. The worm 74 engages the worm wheel 76. Typically, but not exclusively, the worm wheel 76 is permanently engaged with the worm 74 during normal operation of the device 10, whether the actuator assembly 34 is in the motorized or manual configurations.

The actuator body 47 is configured to securely mount thereto the motor 40, worm gear 72, intermediate shaft 52 and driving shaft 44. The actuator body 47 is mounted to the container 14 in any suitable manner. An example of such a suitable manner is further described hereinbelow.

In the manual configuration, the crank 42 is secured to the driving shaft 44, as seen in FIG. 5. In some embodiments, not shown in the drawings, the crank 42 is permanently secured to the driving shaft 44. However, in other embodiments, as illustrated in the drawings, the crank 42 is removably mountable to the remainder of the actuator assembly 34.

For example, the crank 42 includes a crank attachment portion 78, a crank handle 80 and a crank spacing portion 82 extending therebetween. The crank attachment portion 78 is mountable to a protruding portion of the driving shaft 44 that protrudes from the intermediate shaft 52 opposite to the transmission assembly 36. For example, the crank attachment portion 78 is removably mountable to the driving shaft coupling portion 58 when the collar 60 is withdrawn therefrom. To that effect, the crank attachment portion 78 defines a crank aperture 84 substantially snugly receiving the driving shaft coupling portion 58. When the crank 42 is mounted to the driving shaft coupling portion 58, the crank handle 80 is offset from the driving shaft rotation axis 46 and can be rotated about the driving shaft rotation axis 46 to turn the driving shaft 44 thereabout.

In some embodiments, The device 10 defines a crank receiving element 86, for example a collar opening substantially vertically, for receiving the crank 42 thereinto when the crank 42 is detached from the driving shaft 44. The crank receiving element is configured to that the crank attachment portion 78 and crank spacing portion 82 can be received therethrough, but so as to prevent the crank handle 80 from passing therethrough. Therefore, the crank 42 can be safely stowed when not in use.

The transmission assembly 36 transmits the rotation of the driving shaft 44 to the rod 32. In some embodiments, the actuator assembly 34 is provided close to the container bottom wall 16 so as to be relatively easily operable in the manual configuration. The transmission assembly 36 must therefore transmit this rotation of the driving shaft 44 up to the rod 32, which is provided adjacent the container top aperture 20.

In some embodiments, the transmission assembly 36 is configured and sized so that a distance between the driving shaft 44 and the rod 32 remains substantially constant as the rod 32 moves between the rod first and second positions. This may require in some embodiments that the actuator assembly 34 be mounted so as to be movable relative to the container 10.

More specifically, with reference to FIG. 1, in a specific embodiment, the transmission assembly includes an elongated arm 90 defining an arm longitudinal axis 92. The arm 90 defines substantially opposed arm first and second ends 94 and 96, seen for example respectively in FIGS. 4 and 13. As better seen in FIG. 4, The arm first end 94 is substantially adjacent to the driving shaft 44. As better seen in FIG. 13, the arm second end 96 is substantially adjacent to the rod 32. Returning to FIG. 1, the arm 90 is operatively coupled to the driving shaft 44 and rod 32 so that rotation of the driving shaft 44 about the driving shaft rotation axis (not shown in FIG. 1) causes rotation of the arm 90 about the arm longitudinal axis 92, which in turn causes rotation of the rod 32 about the rod longitudinal axis 38. The arm 90 extends substantially perpendicular to the rod 32 and is pivotable relative to the driving shaft 44 between arm first and second positions, shown respectively in FIGS. 2 and 3, wherein the rod 32 is respectively in the rod first and second positions.

In some embodiments, as shown in the drawings, the arm 90 is a fixed length arm so that a distance between the driving shaft 44 and the rod 32 is fixed. However, in other embodiments, the arm 90 may be a telescopic arm having a variable length. In such embodiments, the actuator assembly 34 may be fixed relative to the container 14.

The transmission assembly 36 also includes gearboxes and other components that allow pivotal movements of the arm 90 and allow transmission of the rotation of the driving shaft 44 to the rod 32. For example, the driving shaft 44 is substantially horizontal and the transmission assembly includes a first 90 degrees gearbox 100 between the arm 90 and the driving shaft 44 and a second 90 degrees gearbox 102 between the arm 90 and the rod 32. The arm 32 is coupled to the first 90 degrees gearbox 100 using a universal joint 104 to allow pivotal movement of the arm 90 between the arm first and second positions as the rod 32 moves between the rod first and second positions.

In some embodiments, the path of the rod 32 between the rod first and second positions differs from an arc segment centered on the universal joint 104 with a radius of curvature equal to the length of the arm 90. Therefore, the arm 90 needs to be telescopic, or the location about which the arm 90 pivots needs to move relative to the container 14. This last option is illustrated in the drawings.

More specifically, the device 10 includes a mounting bracket 106 secured to the transmission assembly 34 for mounting the transmission assembly 36 to the container peripheral wall 18. The mounting bracket 106 is configured and sized for allowing vertical movements the arm 90 relative to the container peripheral wall 18. This is achieved by suitably mounting part of the transmission assembly 36 thereto. In some embodiments, the actuator assembly 34 is also mounted to the mounting bracket 106.

Referring for example to FIG. 7, the mounting bracket 106 includes a base 108 fixedly secured to the container peripheral wall 18 (not shown in FIG. 7, and a bracket mobile portion 110 movable vertically relative to the container 14. The arm 90 is mechanically coupled to the bracket mobile portion 110 at the arm first end 94 so that the arm first end 94 is vertically movable along with the bracket mobile portion 110, for example through the first 90 degrees gearbox 100.

The mounting bracket 106 also includes a pair of levers 112 extending substantially parallel to each other and vertically spaced apart from each other. In some embodiments of the invention, two pairs of levers 112 are provided. The two pairs of levers 112 are substantially parallel to each other and spaced apart from each other in a direction leading between the container first and second ends 11 and 13. Each lever 112 is pivotally mounted at one end 114 thereof to the base 108 and pivotally mounted at another end 116 thereof to the bracket mobile portion 110.

The bracket mobile portion 110 takes for example the form of a frame to which other components may be secured. For example, the actuator assembly 34 is mounted to the bracket mobile portion 110, along with part of the transmission assembly 36. More generally, one of the actuator and transmission assemblies 34 and 36 is mounted to the bracket mobile portion 110. In the embodiment illustrates in FIGS. 6 and 7, the first 90 degrees gearbox 100 is mounted to the bracket mobile portion so as to be rotated by the actuator assembly 34.

As seen in FIG. 1, the base 108 is mounted to the container 14 on the container first side 15, for example substantially adjacent the container bottom wall 16 and substantially midway between the container first and second ends 11 and 13.

Any suitable container 14 may be used with the device 10. The tarpaulin 12 is supported by the container 14 when moving between the tarpaulin first and second positions. To that effect, the container 14 defines at least one tarpaulin support 118 extending between the container first and second ends 11 and 13 across the container top aperture 20. For example, the at least one tarpaulin support includes at least two arches 120 spaced apart from each other and each extending across the container top aperture 20 between the container first and second ends 11 and 13. In a specific non-limiting embodiment of the invention, three arches 120 are provided, one adjacent each of the container first and second sides 15 and 17, and a third one midway between the first two ones. However, any other suitable number of arches 120 is usable. Each arch 120 includes for example three rectilinear tubes joined sequentially to each other. In other embodiments (not shown in the drawings, the at least one tarpaulin support includes part of the top aperture peripheral edge 22 on which the rod 32 and/or tarpaulin 12 are supported.

Figure 15:
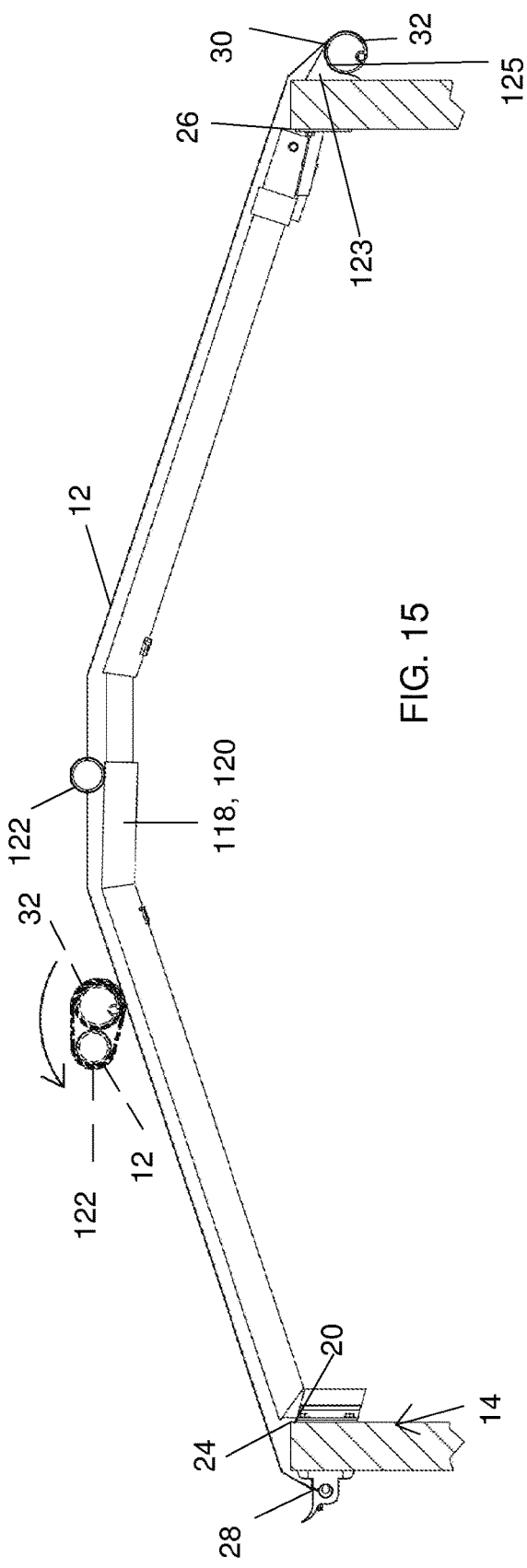
FIG. 15, in a side cross-sectional view along section line XV-XV of FIG. XIV, illustrates the tarpaulin of FIGS. 1 to 3, a long with a support rod usable to support a middle portion of the tarpaulin when the letter is in a tarpaulin extended configuration.

In some embodiments, a support rod 122 is mounted to the tarpaulin 12 at a location intermediate the tarpaulin first and second ends 28 and 30. For example the support rod 122 is provided so that when the tarpaulin 12 is in the extended configuration, the support rod 122 is midway between the aperture first and second ends 24 and 26 and extends along substantially the distance between the container first and second sides 15 and 17. As seen in FIG. 15, the support rod 122 is rolled around the rod 32 along with the tarpaulin 12 when the latter is sufficiently rolled around the rod 32.

Also, in some embodiments, anchoring blocks 123 are provided. The device 10 may include a plurality of anchoring blocks 123 spaced apart from each other along the container top aperture 20 substantially adjacent the aperture second end 26. The anchoring blocks 123 are provided slightly below the aperture second end 26 and each define a recess 125, for example an inverted J-shaped recess 125. The recess 125 opens generally towards a plane containing the container bottom wall 16 when the anchoring blocks 123 are operatively mounted to the container 14 and the recess 125 is configured and sized for receiving the rod 32 thereinto when arm 90 is in the arm second position.

FIGS. 11 to 13 illustrate respectively various biasing element 48b, 48 and 48a usable in the device 10. The device 10 typically includes two of these biasing elements 48, 48a and 48b, one provided at each end of the rod 32, but use of one or more than two biasing elements 48, 48a and 48b is within scope of the invention. When more than one biasing element 48, 48a and 48b are used, all the biasing elements 48, 48a and 48b may be of the same type, or various types may be mixed in the same device 10. All the types of biasing elements 48, 48a and 48b are provided to pull the rod 32 towards the rod second position.

Referring to FIG. 12, there is shown the biasing element 48. The biasing element 48 includes a coil spring 124 mounted in a tubular body 126 fixed to the container 14. One end of the coil spring 124 is fixed relative tubular body 126 (not shown in the drawings), and a cable 128 extends from the other end of the coil spring 124. The cable 128 is rolled around the rod 32 so that it unrolls therefrom when the rod 32 is moved towards the rod first position and is rolled therearound when the rod 32 is moved towards the rod second position. A tension is present in the coil spring 124 so that the cable 128 pulls on the rod 32 towards the rod second position.

Referring to FIG. 13, there is shown the biasing element 48a. The biasing element 48a includes a pulley 130 mounted rod 32 so as to be rotatable relative thereto. A torsion spring 132 extends between the pulley 130 and the rod 32. A cable 134 is rolled around the pulley 130 at one end thereof and is secured to the container 14 at the container second end 13 at the other end thereof. The torsion spring 132 is configured to exert a torque pulling on the cable 134 so that the cable 134 has a tendency to be rolled around the pulley 130, which biases the rod 32 towards the rod second position.

Referring to FIG. 11, there is shown the biasing element 48b. The biasing element 48b includes a coil spring 136 mounted in the rod 32, which is hollow along at least part thereof. One end of the coil spring 136 is fixed longitudinally relative rod 32 (not shown in the drawings), and a cable 138 extends from the other end of the coil spring 136. The cable 138 protrudes from the rod 32 and is fixed to the container 14 at the container second end 13. A tension is present in the coil spring 136 so that the cable 138 pulls on the rod 32 towards the rod second position.

Biasing elements similar to the biasing elements 48, 48a and 48b, and usable in the device 10 are further described in U.S. Pat. No. 6,595,594 issued Jul. 22, 2003 and U.S. Pat. No. 7,506,912 issued Mar. 24, 2009, both issued to Royer, and US Patent Application Publication 20020021018 of Royer published Feb. 21, 2002, the contents of which is hereby incorporated by reference in its entirety.

In operation, the device 10 works as follows. Taking for example as an initial configuration the configuration shown in FIG. 2 with the actuator assembly 34 in the motorized configuration, the arm 90 is in the arm first position. The rod 32 is thus in the rod first position with the tarpaulin 12 rolled therearound. The biasing element 48 biases the rod 32 towards the rod second position. However, the structure of the motor 40 and of the components linking the motor 40 to the rod 32 prevents the rod 32 from moving. It should be noted that in alternative embodiments other components, such as a lock, a clutch or a brake, prevent this movement instead.

When the motor 40 is rotated in a suitable direction, the intermediate shaft 52 is rotated through the worm gear 72. Since the shaft coupling element 54 is in the coupling configuration, the driving shaft 44 is then also rotated by the action of the motor 40, which turns the various elements of the transmission assembly 36 to rotate the rod 32 so that the tarpaulin 12 is released from the rod 32. The rod 32 is then free to move under the action of the biasing element 48 until the extended configuration is achieved. The bracket mobile portion 110 moves up and down due to the pivotal movement of the levers 112 as the tarpaulin moves between the tarpaulin retracted and extended configurations to endure that the rod 32 is always supported by the container 14. Retraction of the tarpaulin 12 is achieved by rotating the motor 40 in the opposite direction.

If for any reason the motor 40 cannot be used to operate the device 10, the actuator assembly 34 is moved to the manual configuration by sliding the collar 60 so that the driving shaft 44 is free to rotate relative to the intermediate shaft 52. Then, the crank 42 is mounted to the driving shaft 44 and can be used to rotate the rod 32 in either direction.

Figure 17:
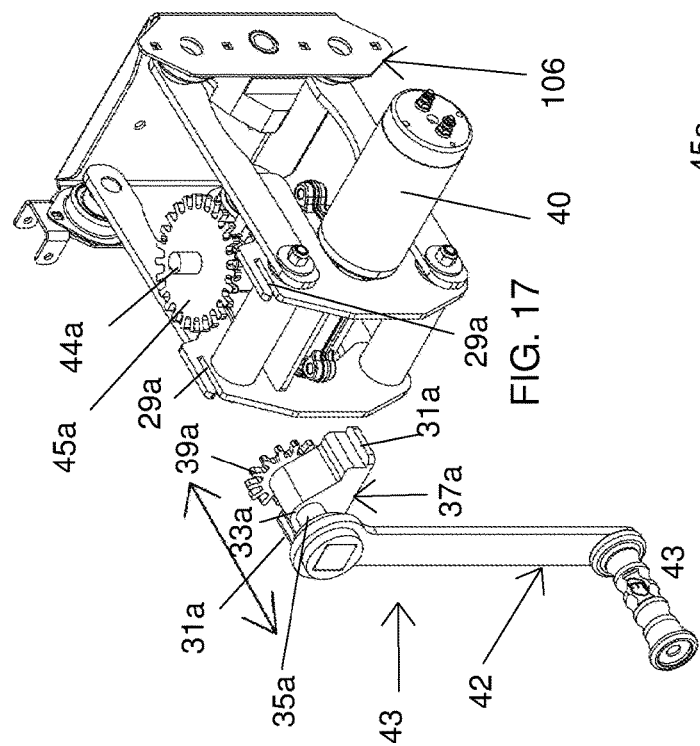
FIG. 17, in a perspective partially exploded view, illustrates the actuator assembly of FIG. 16.
Figure 18:
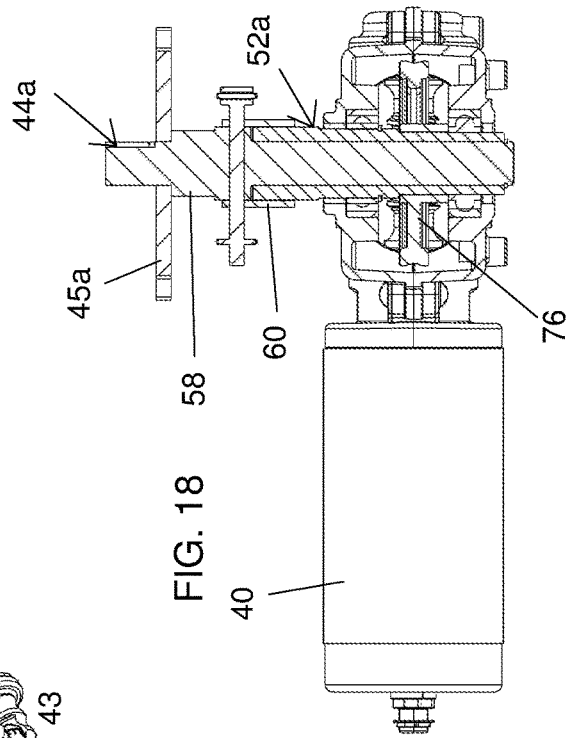
FIG. 18, in a partial side-cross-sectional view, illustrates the actuator assembly of FIGS. 16 and 17 in the motorized configuration.
Figure 16:
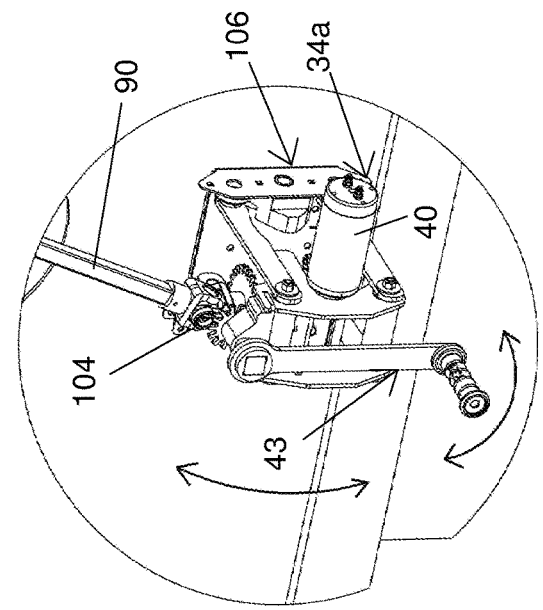
FIG. 16, in a perspective view, illustrates an alternative embodiment of an actuator assembly usable in the device of FIGS. 1 to 3, the actuator assembly being shown in a manual configuration.

FIGS. 16 to 18 illustrate an alternative actuator assembly 34a similar to the actuator assembly 34. The actuator assembly 34a is similar in structure and function to the actuator assembly 34 except that the driving shaft 44a is vertical and only needs to protrude from the intermediate shaft 52a at one end thereof. Since the driving shaft 44a is vertical, the first 90 degrees gearbox 100 can be omitted and the driving shaft 44a can be directly coupled to the universal joint 104.

As seen for example in FIG. 18, the driving shaft 44a is provided with a driving shaft gear 45a extending circumferentially therearound outside of the intermediate shaft 52, for example further away from the intermediate shaft coupling portion 56 than the driving shaft coupling portion 58. Referring to FIG. 17, the crank 42 is part of a crank assembly 43a including a crank gear 39a and a crank assembly body 37a. The crank 42 is operatively coupled to the crank gear 39a for selectively rotating the crank gear 39a relative to the crank assembly body 37a. The crank assembly body 37a is mountable to a remainder of the actuator assembly 34a so that the crank 42 and driving shaft gears 45a are engaged with each other, for example perpendicular to each other, so that rotating the crank 42 is may rotate the driving shaft 44a.

For example, the crank assembly 43a includes a crank assembly shaft 35a rotatably mounted in a suitably located and configured mounting aperture 33a extending through the crank assembly body 37a. The crank assembly shaft 35a protrudes at both ends thereof from the crank assembly body 37a. The crank 42 and crank gear 39a are mounted at respective ends of the crank assembly shaft 35a so that the crank 42, crank assembly shaft 35a and crank gear 39a are jointly rotatable.

The crank assembly body 37a is typically removably mountable to the remainder of the actuator assembly 34a so that when operatively mounted thereto, the crank gear 39a engages the driving shaft gear 45a so that rotating the crank gear 39a rotates the driving shaft gear 45a. For example, the crank assembly body 37a defines a pair of opposed tongues 31a each slidably receivable in a respective substantially horizontal slit 29a when the crank assembly 44a is operatively mounted to the remainder of the actuator assembly 34a. When the collar 60 is slid so that the driving shaft 44a and intermediate shaft 52a are uncoupled from each other, the crank 42 can be rotated to rotate the driving shaft 44a, as in the embodiment of the actuator assembly 34 described hereinabove.

Figure 21:
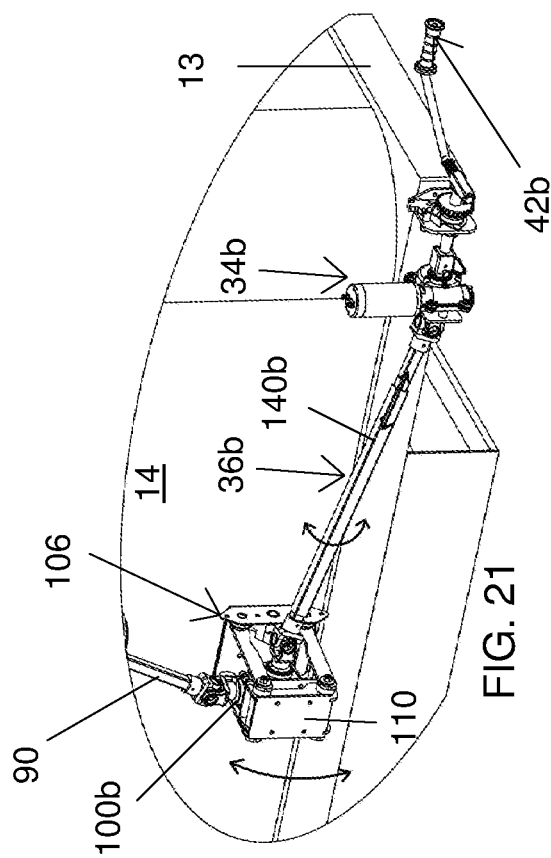
FIG. 21, in a perspective view, illustrates yet an other alternative embodiment of an actuator assembly and a transmission assembly usable in the device of FIGS. 1 to 3.

FIGS. 21 to 24 illustrate an alternative actuator assembly 34b and an alternative transmission assembly 36b. Referring to FIG. 21, instead of being located substantially midway between the container first and second ends 11 and 13, the actuator assembly 34b is provided at one of the container first and second ends 11 and 13, to facilitate access to the crank 42b by an intended user. More specifically, instead of being mounted directly to the mounting bracket 106, the actuator assembly 34b is mounted to the container 14 substantially adjacent to one of the container first and second ends 11 and 13 (the container second end 13 in the specific example illustrated in the drawings).

The transmission assembly 36b includes an intermediate gearbox 100b, replacing the first 90 degrees gearbox 100 and an extension shaft 140b. The extension shaft 140b extends between the driving shaft 44b and the intermediate gearbox 100b. The intermediate gearbox 100b is mounted to the bracket mobile portion 110, and the arm 90 is mounted to the intermediate gearbox 100b similarly to the manner in which the arm 90 is mounted to the first 90 degrees gearbox 100. The intermediate gearbox 100b is for example a 90 degrees gearbox. The actuator assembly 34b, extension shaft 140b, intermediate gearbox 100b and arm 90 are mechanically coupled to each other so that rotation of the driving shaft 44b about the driving shaft rotation axis 46 causes rotation of the arm 90 about the arm longitudinal axis 92. The extension shaft 140b is telescopic and is coupled to the driving shaft 44a and intermediate gearbox 100b with universal joints to accommodate vertical movements of the bracket mobile portion 110.

FIG. 22 better illustrate the actuator assembly 34b. The actuator body 47b is provided with an actuator body mounting bracket 150b securable to the container 14 (not shown in FIG. 22). The crank 42b is part of a crank assembly 43b including a crank assembly shaft 35b rotatably mounted in a suitably located and configured mounting aperture (not shown in the drawings) extending through a crank assembly body 37b mountable to the container 14. In some embodiments, the crank assembly shaft 35b may be mounted to the crank assembly body 37b using a bearing to facilitate its rotation. In alternative embodiments, the actuator assembly 34b has any other suitable configuration and is mounted to the container 14 in any other suitable manner.

The crank assembly shaft 35b protrudes at both ends thereof from the crank assembly body 37b. The crank assembly shaft 35b may extend integrally from the driving shaft 44b, or, as shown in FIGS. 23 and 24, may be coupled thereto axially through a bearing 31b opposed to the crank 42b (not shown in FIGS. 23 and 24). The bearing 31b allows the crank assembly shaft 35b and the driving shaft 44b to rotate freely relative to each other. To achieve the manual configuration, the collar 60 is moved to overlap a crank shaft coupling portion 29b similar in cross-section to the driving shaft coupling portion 58, thereby allowing locked joint rotation of the crank assembly shaft 35b and driving shaft 44b. Motorized and manual configurations are illustrated in FIGS. 23 and 24 respectively.

When the bearing 31b is used, the crank 42 may be permanently left secured to the crank assembly shaft 35b as in motorized operation, the collar 60 is withdrawn from the crank shaft coupling portion 29b and rotation of the driving shaft 44b does not cause rotation of the crank assembly shaft 35b.

In some embodiments, as seen in FIG. 21, the crank assembly 43b is provided with a conventional ratchet type mechanism 27b. The ratchet type mechanism 27b is configurable to prevent rotation of the crank 42b in an undesired direction, while allowing rotation of the crank 42b in the opposite direction.

Figure 20:
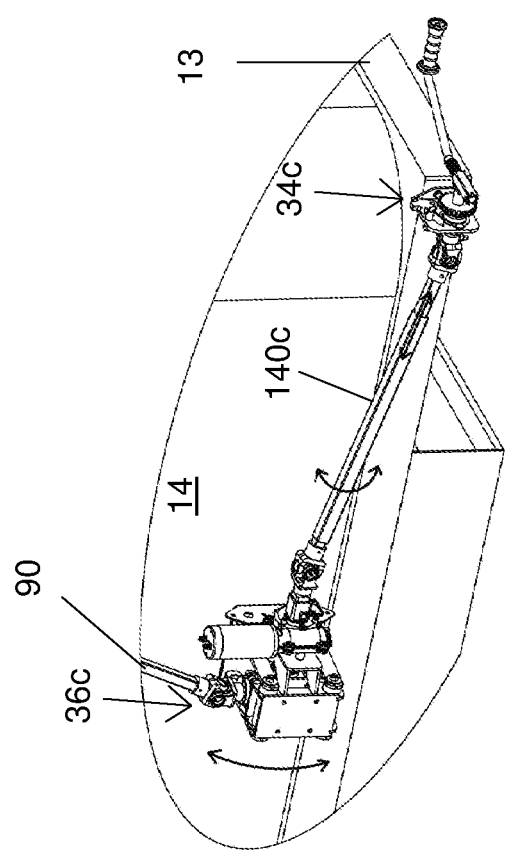
FIG. 20, in a perspective view, illustrates an other alternative embodiment of an actuator assembly and a transmission assembly usable in the device of FIGS. 1 to 3.

FIG. 20 illustrates illustrates yet another actuator and transmission assemblies 34c and 36c configuration. The actuator and transmission assemblies 34c and 36c are similar to the actuator and transmission assemblies 34b and 36b except that the extension shaft 140c is provided between the driving shaft 44c and the crank assembly shaft 35b, and is therefore part of the actuator assembly 34c instead of being part of the transmission assembly 36c. The driving shaft 44c is therefore directly attached to the intermediate gearbox 100c. Otherwise, the actuator and transmission assemblies 34c and 36c and the actuator and transmission assemblies 34b and 36b operate similarly and have similar structures.

Figure 19:
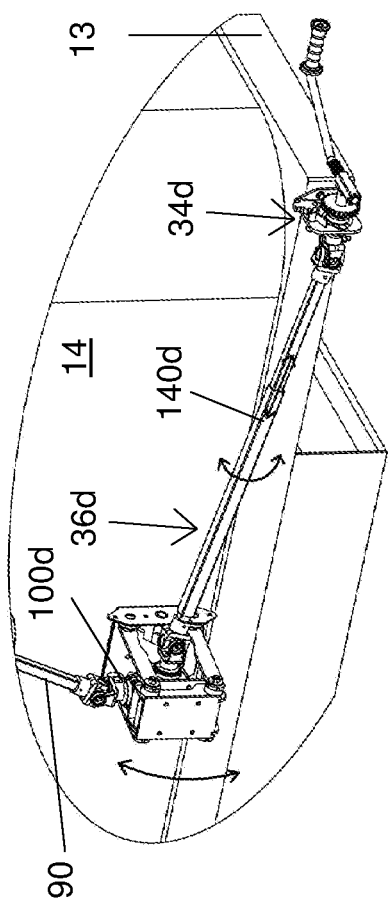
FIG. 19, in a perspective view, illustrates alternative embodiments of an actuator assembly and a transmission assembly usable in the device of FIGS. 1 to 3.

It should be noted that in some embodiments, the motor 40, worm gear 72 and intermediate shaft 52 are omitted and that in these embodiments, the actuator assembly 34, 34a or 34b is completely manually operated. In some of these embodiments, embodiments, the actuator assembly may be similar to the actuator assembly 34, except for the absence of the components required for motorized operation. In other such embodiments, the actuator assembly 34d and transmission assembly 36d may be as illustrated in FIG. 19, which is similar to the actuator assembly 34c and transmission assembly 36c, except that the the motor 40, worm gear 72 and intermediate shaft 52 are omitted. The extension shaft 104d is therefore coupled to the intermediate gearbox 100d for joint rotation therewith.

In yet other embodiments, as seen in FIGS. 25 and 26, an actuator assembly 34e is similar to the actuator assembly 34d except that the actuator assembly 34e includes a crank extension shaft 141e supporting the crank 42e. The crank extension shaft 141e is telescopic so as to be configurable between a retracted configuration (seen in FIG. 25) and an extended configuration (seen in FIG. 26). In the retracted configuration, the crank 42e is retracted from the container second end 33 so that the crank 42e is not exposed when not needed. In the extended configuration, the crank 32e protrudes from the container second end 33 so that the crank 42e can be operated as described hereinabove. In some embodiments, a crank securing member 143e is provided adjacent the crank 42e and engages a suitably shaped container securing member 145e to stabilize the crank 42e in the extended configuration.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising:

a rod defining a rod longitudinal axis, the rod being movable between rod first and second positions wherein the rod is respectively substantially adjacent the aperture first and second ends, the tarpaulin being mountable to the rod at the tarpaulin second end to allow rolling of the tarpaulin thereonto and unrolling of the tarpaulin therefrom when the rod is rotated about the rod longitudinal axis;

an actuator assembly, the actuator assembly including an actuator and a driving shaft defining a substantially longitudinal driving shaft rotation axis, the actuator being mechanically coupled to the driving shaft for selectively rotating the driving shaft about the driving shaft rotation axis; and a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis;

wherein the transmission assembly is configured and sized so that a distance between the driving shaft and the rod remains substantially constant as the rod moves between the rod first and second positions; and wherein rotating the rod using the actuator to roll the tarpaulin therearound moves the rod towards the rod first position to move the tarpaulin to the tarpaulin retracted configuration and rotating the rod using the actuator to unroll the tarpaulin therefrom moves the rod towards the rod second position to move the tarpaulin to the tarpaulin extended configuration.

2. The device as defines in claim 1, further comprising a mounting bracket secured to the actuator and transmission assemblies for mounting the actuator and transmission assemblies to the container peripheral wall, the mounting bracket being configured and sized for allowing vertical movements of the actuator and transmission assemblies relative to the container peripheral wall.

3. The device as defined in claim 2, wherein the mounting bracket includes a base fixedly securable to the container peripheral wall and a pair of levers extending substantially parallel to each other and vertically spaced apart from each other, each lever being pivotally mounted at one end thereof to the base and pivotally mounted at another end thereof to one of the actuator and transmission assemblies.

4. The device as defined in claim 2, wherein the transmission assembly includes an elongated arm defining an arm longitudinal axis, the arm defining substantially opposed arm first and second ends, the arm first end being substantially adjacent to the driving shaft and the arm second end being substantially adjacent to the rod, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions.

5. The device as defined in claim 4, wherein the arm is a fixed length arm.

6. The device as defined in claim 4, wherein the transmission assembly includes a first 90 degrees gearbox between the arm and the driving shaft and a second 90 degrees gearbox between the arm and the rod, the arm being coupled to the first 90 degrees gearbox using a universal joint to allow pivotal movement of the arm between the arm first and second positions as the rod moves between the rod first and second positions.

7. The device as defined in claim 1, further comprising a biasing element operatively coupled to the rod for biasing the rod towards the rod second position.

8. The device as defined in claim 2, wherein the actuator includes at least one of a motor and a crank operatively coupled to the driving shaft for selectively rotating the driving shaft.

9. The device as defined in claim 8, wherein the actuator assembly includes the motor and the crank, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor.

10. A covered vehicle container, comprising:
   a container defining a container bottom wall, a container top aperture above the container bottom wall, opposed container first and second ends and opposed container first and second sides each extending between the container first and second ends, the container defining at least one tarpaulin support extending between the container first and second ends across the container top aperture;
   a tarpaulin defining tarpaulin first and second ends, the tarpaulin being secured to the container first end substantially adjacent to the tarpaulin first end, the tarpaulin being movable between tarpaulin retracted and extended configurations in which the tarpaulin is respectively substantially retracted from the container top aperture and extended across the container top aperture; and
   a device for handling the tarpaulin, the device including:
      a rod defining a rod longitudinal axis, the rod being movable between rod first and second positions wherein the rod is respectively substantially adjacent the container first and second ends, the tarpaulin being mounted to the rod at the tarpaulin second end to allow rolling of the tarpaulin thereonto and unrolling of the tarpaulin therefrom when the rod is rotated about the rod longitudinal axis;
      an actuator assembly, the actuator assembly including an actuator and a driving shaft defining a substantially longitudinal driving shaft rotation axis, the actuator being mechanically coupled to the driving shaft for selectively rotating the driving shaft about the driving shaft rotation axis;
      a transmission assembly between the actuator assembly and the rod, the transmission assembly being operatively coupled to the actuator assembly and to the rod for transmitting rotations of the driving shaft to the rod so that rotation of the driving shaft about the driving shaft rotation axis causes rotation of the rod about the rod longitudinal axis; and
      a biasing element operatively coupled to the rod for biasing the rod towards the rod second position;
      wherein the transmission assembly includes an elongated arm defining an arm longitudinal axis, the arm being a fixed length arm and defining substantially opposed arm first and second ends, the arm first end being substantially adjacent to the container bottom wall and the arm second end being substantially adjacent to the container top aperture, the arm being operatively coupled to the driving shaft and rod so that rotation of the driving shaft about the driving shaft rotation axis causes rotation of the arm about the arm longitudinal axis, which in turn causes rotation of the rod about the rod longitudinal axis, the arm extending substantially perpendicular to the rod and being pivotable relative to the driving shaft between arm first and second positions, wherein the rod is respectively in the rod first and second positions;
      wherein the arm is operatively coupled to the container and to the actuator assembly at the arm first end so that a vertical distance between the arm first end and the container bottom wall is allowed to vary as the rod moves between the rod first and second positions;
   wherein rotating the rod using the actuator assembly to roll the tarpaulin therearound moves the rod towards the rod first position to move the tarpaulin to the tarpaulin retracted configuration and rotating the rod using the actuator assembly to unroll the tarpaulin therefrom moves the rod towards the rod second position to move the tarpaulin to the tarpaulin extended configuration.

11. The covered vehicle container as defines in claim 10, further comprising a mounting bracket, the mounting bracket including a base fixedly mounted to the container and a bracket mobile portion movable vertically relative to the container, the arm being mechanically coupled to the bracket mobile portion at the arm first end so that the arm first end is vertically movable along with the bracket mobile portion.

12. The covered vehicle container as defined in claim 11, wherein the mounting bracket includes a pair of levers extending substantially parallel to each other and vertically spaced apart from each other, each lever being pivotally mounted at one end thereof to the base and pivotally mounted at another end thereof to the bracket mobile portion.

13. The covered vehicle container as defined in claim 11, wherein the actuator assembly is mounted to the bracket mobile portion.

14. The covered vehicle container as defined in claim 12, wherein the base is mounted to the container on the container first side.

15. The covered vehicle container as defined in claim 14, wherein the base is mounted substantially midway between the container first and second ends.

16. The covered vehicle container as defined in claim 15, wherein the actuator assembly is mounted to the container substantially adjacent to one of the container first and second ends, the transmission including an intermediate gearbox and an extension shaft, the extension shaft extending between the driving shaft and the intermediate gearbox, the intermediate gearbox being mounted to the bracket mobile portion, and the arm being mounted to the intermediate gearbox, the actuator assembly, extension shaft, intermediate gearbox and arm being mechanically coupled to each other so that rotation of the driving shaft about the shaft longitudinal axis causes rotation of the arm about the arm longitudinal axis.

17. The covered vehicle container as defined in claim 15, wherein the driving shaft is mounted to the bracket mobile portion, the actuator assembly further including a crank shaft provided substantially adjacent one of the container first and second ends, the actuator being mechanically coupled to the crank shaft so as to rotate the latter about a crank shaft rotation axis, an extension shaft being provided between the crank shaft and the driving shaft to transmit rotations of the crank shaft to the driving shaft to rotate the latter.

18. The covered vehicle container as defined in claim 17, wherein the extension shaft is coupled to the driving and crank shafts with universal joints.

19. The covered vehicle container as defined in claim 10, wherein the transmission assembly includes a first 90 degrees gearbox between the arm and the driving shaft and a second 90 degrees gearbox between the arm and the rod, the arm being coupled to the first 90 degrees gearbox using a universal joint to allow pivotal movement of the arm between the arm first and second positions as the rod moves between the rod first and second positions.

20. The device as defined in claim 10, wherein the actuator includes at least one of a motor and a crank operatively coupled to the driving shaft for selectively rotating the driving shaft.

21. The device as defined in claim 20, wherein the actuator assembly includes the motor and the crank, the actuator assembly being configurable between a motorized configuration and a manual configuration, wherein, in the motorized configuration, the motor is mechanically coupled to the driving shaft for selectively rotating the driving shaft about the driving shaft rotation axis when the motor is powered, and, in the manual configuration, the motor is uncoupled from the driving shaft and the crank is mechanically coupled to the driving shaft so that the crank is usable to selectively rotate the driving shaft independently of the motor.

* * * * *